United States Patent
Winter et al.

(10) Patent No.: US 8,244,094 B2
(45) Date of Patent: Aug. 14, 2012

(54) METHOD AND APPARATUS FOR REPLAYING A VIDEO SIGNAL AND ONE OR MORE AUDIO SIGNALS RELATED TO AUDIO/VIDEO DATA THAT ARE BASED ON A 24HZ FRAME FREQUENCY VIDEO SIGNAL

(75) Inventors: Marco Winter, Hannover (DE);
Hartmut Peters, Barsinghausen (DE);
Johannes Boehm, Goettingen (DE);
Ernst F. Schroeder, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 1104 days.

(21) Appl. No.: 11/883,426

(22) PCT Filed: Jan. 24, 2006

(86) PCT No.: PCT/EP2006/050394
§ 371 (c)(1), (2), (4) Date: Jul. 31, 2007

(87) PCT Pub. No.: WO2006/082150
PCT Pub. Date: Aug. 10, 2006

(65) Prior Publication Data
US 2009/0122191 A1     May 14, 2009

(30) Foreign Application Priority Data

Feb. 7, 2005 (EP) .................................... 05090020
Mar. 4, 2005 (EP) .................................... 05090056

(51) Int. Cl.
*H04N 5/765*     (2006.01)
*H04N 9/80*      (2006.01)
*H04N 5/93*      (2006.01)

(52) U.S. Cl. .......... 386/232; 386/239; 386/248; 386/353

(58) Field of Classification Search .................. 386/232, 386/239–248, 353–357
See application file for complete search history.

(56) References Cited

U.S. PATENT DOCUMENTS 4,523,227 A * 6/1985 Hurst ............................ 348/548
(Continued)

FOREIGN PATENT DOCUMENTS

EP          1613075          4/2006
(Continued)

OTHER PUBLICATIONS

Search Report Dated May 22, 2007 for PCT/EP2006/050394.

*Primary Examiner* — Thai Tran
*Assistant Examiner* — Hung Dang
(74) *Attorney, Agent, or Firm* — Tutunjian & Bitetto, P.C.

(57) ABSTRACT

Movies are produced in 24 Hz frame frequency and progressive scanning format (denoted 24p) for projection in film theatres, adhering to a worldwide standard for 35 mm film. However, the major TV systems in the world use interlaced scanning and either 50 Hz field frequency (denoted 50i) or 60 Hz field frequency (denoted 60i). Content providers would prefer providing single-picture-frequency single-audio-speed AV discs that can be replayed in most parts of the world. According to the invention, For a 50 HZ output mode, in the media player either audio signal frames are dropped adaptively or video fields or frames are repeated adaptively, depending on the current video and audio content. Thereby the less perceptible stream controls the synchronization.

14 Claims, 14 Drawing Sheets

U.S. PATENT DOCUMENTS

| | | | |
|---|---|---|---|
| 5,771,357 A * | 6/1998 | Kato et al. | 709/247 |
| 6,263,505 B1 * | 7/2001 | Walker et al. | 725/110 |
| 6,567,097 B1 * | 5/2003 | Iwaki | 345/603 |
| 6,728,317 B1 * | 4/2004 | Demos | 375/240.21 |
| 6,810,198 B1 * | 10/2004 | Kuroda et al. | 386/232 |
| 7,596,297 B2 | 9/2009 | Kato | |
| 2003/0031461 A1 * | 2/2003 | Takayama | 386/52 |
| 2003/0165327 A1 * | 9/2003 | Blair et al. | 386/75 |
| 2004/0071211 A1 * | 4/2004 | Washino | 375/240.01 |
| 2004/0150745 A1 * | 8/2004 | Aiba | 348/441 |

FOREIGN PATENT DOCUMENTS

| | | |
|---|---|---|
| JP | 965303 | 3/1997 |
| JP | 9-65303 | 7/1997 |
| JP | WO2004032494 | 4/2004 |
| JP | 2004289484 | 10/2004 |
| WO | WO 00/59218 | 10/2000 |
| WO | WO0177871 | 10/2001 |
| WO | WO03075566 | 9/2003 |
| WO | WO2004091204 | 10/2004 |
| WO | WO2005071956 | 8/2005 |

* cited by examiner

| Flag name in MPEG-2 code | progressive_ sequence | progressive_ frame | picture_ structure | top_ field_first | repeat_ first_field | |
|---|---|---|---|---|---|---|
| Block name in MPEG-2 code | sequence_ extension() | picture_coding_extension() | | | | resulting presentation |
| 1 | 0 | 0 | 01 | 0 | 0 | T-B |
| 2 | 0 | 0 | 10 | 0 | 0 | B-T |
| 3 | 0 | 0 | 11 | 0 | 0 | B-T |
| 4 | 0 | 0 | 11 | 1 | 0 | T-B |
| 9 | 1 | 1 | 11 | 0 | 0 | Fr |
| 10 | 1 | 1 | 11 | 0 | 1 | Fr-Fr |
| 11 | 1 | 1 | 11 | 1 | 1 | Fr-Fr-Fr |

METHOD AND APPARATUS FOR REPLAYING A VIDEO SIGNAL AND ONE OR MORE AUDIO SIGNALS RELATED TO AUDIO/VIDEO DATA THAT ARE BASED ON A 24HZ FRAME FREQUENCY VIDEO SIGNAL

This application claims the benefit, under 35 U.S.C. §365 of International Application PCT/EP2006/050394, filed Jan. 24, 2006, which was published in accordance with PCT Article 21(2) on Aug. 10, 2006 in English and which claims the benefit of European patent application No. 050900208, filed Feb. 7, 2005 and European patent application No. 05090056.2, filed Mar. 4, 2005.

The invention relates to a method and to an apparatus for replaying together a video signal and one or more audio signals which are related to audio/video data that are based on 24 Hz frame frequency for the video signal and an audio signal speed corresponding to said 24 Hz frame frequency.

BACKGROUND

Movies are produced in 24 Hz frame frequency and progressive scanning format (denoted 24p) for projection in film theatres, adhering to a worldwide standard for 35 mm film. The projection speed has been fixed since many decades to 24 full pictures per second. Accompanying sound signals, typically present as optical tracks on the same material, are replayed with the same speed. Such playback can be performed in virtually any existing film theatre in the world.

The situation becomes different when such movies are played back via a television system, e.g. by a broadcaster. The major TV systems in the world use interlaced scanning and either 50 Hz field frequency (denoted 50i, e.g. in Europe, China and Australia for PAL and SECAM) or 60 Hz field frequency (denoted 60i, e.g. in USA and Japan for NTSC). In 60i countries the TV system is constructed such that 30 full video frames are displayed per second. Movie playback is performed with basically correct overall speed by presenting one film frame alternately in two or in three video fields using 3:2 pull-down. It should be noted that in the NTSC colour TV system the actual field rate is 59.94 Hz, which means that the movie is actually broadcast with 23.976 frames per second, i.e. slower than original speed by a factor of 1000/1001. This is generally not noticed by TV viewers.

In 50 Hz countries the situation is more difficult. The simplest solution is running the movie with 25 frames per second, i.e. 4.2% faster. Although by this method the sound has a 4.2% higher pitch (nearly one half-tone higher), typically customers do not complain. If movies are recorded on A/V media (e.g. VCR Videos, CDIs and DVDs) and such media are played back using TV receivers as presentation devices, generally the same principles apply. If the accompanying sound present on the medium is in digital form (e.g. linear PCM or AC-3 coded or DTS coded), either the playback device must decode and present the audio information with 4.2% higher speed, which generally is not a problem, or DVD Video or CDI discs sold in 50 Hz countries must contain audio data streams that are already encoded such that, while the video signal is output with 4.2% higher speed, the player's audio decoder automatically outputs the correct speed and pitch of the audio signal.

To summarise, there are currently three established playback speeds for AV streams (Audio Video streams): 24 progressive frames per second (24p) used in cinemas, 50 interlaced fields per second (50i) and 60 interlaced fields per second (60i).

An alternative would be carrying out audio decoding, pitch-conversion and audio re-encoding in the player. However, this would require very expensive player hardware and higher license costs because of the additional audio encoding.

If a disc manufacturer produces a record for more than two different speeds, then a transformation from one speed to one of the other speeds would be the first choice. Because it consumes too much time and money to produce the movie again with the new speed, the original movie will be used again, i.e. the original record will be transcoded to the new speed. Usually moviemakers transcode 24p movies to 60i DVD Videos and to 50i DVD Videos.

Modern TV receivers can handle different playback speeds while keeping the same colour system PAL, NTSC or SECAM. For example, many TV sets sold currently in Europe can present replayed 60i records. But many old TV sets can not handle video input signals having such speed shifts. Even some modern 100 Hz TV sets are malfunctioning when receiving 60i input data. Some old devices play back coloured 60i content without colour, other devices can not play back even a stable picture. For such reason e.g. the DVD Video Format distinguishes between 50i and 60i countries for getting discs with their preferred/supported speed.

Note that the (analog) colour system does not matter anyway because it is not part of the recorded (MPEG) bit streams. The appropriate colour system will be applied or encoded after decompression of the video content.

As mentioned above, 3:2 pull-down is used for transcoding from 24p to 60i. The consumers in 60i countries know and widely accept the resulting drawbacks like slightly jerking video playback due to field repetition. A 4.2% faster playback speed is used for transcoding from 24p to 50i. Most consumers in 50i countries accept the resulting drawbacks like 50i flickering and increased pitch. Some drawbacks are already reduced or even removed, e.g. by using 100 Hz TV sets with sophisticated motion compensation. However, the total playing time is 4.2% shorter than in cinema. The advantage of such speed-up is that the video playback does not have any jerks, but the audio stream must be transcoded to perform the faster playback. So, the audio streams of the same movie differ significantly between 50i discs and 60i discs, but the (MPEG) video stream is very similar. The main difference of the video streams is that the 60i video stream contains additional 3:2 pull-down flags and different time stamps. MPEG means e.g. MPEG-2 Video, MPEG-4 Video or MPEG-4 AVC.

Consumers accept the drawbacks of the transcoding method used in their country but do not like the different drawbacks of the other country. The 60i consumers don't like the flickering of 50i TV sets (theoretically this could be overcome by replacing current 60i TV sets by TV sets, which are also compatible to 50i by applying 100 Hz techniques, or by using slow LCD displays). The 50i consumers don't like the jerks of the 60i video (theoretically this could be overcome by replacing current discs, players and TV sets by 24p compatible discs, players, and TV sets).

FIG. 1 shows at the left side a known DVD player DVDP with a known 50i disc 50iDVD inserted. The player outputs 50i AV. The right side depicts how the 50i disc content is presented on an old-fashion 50i only TV set OLDF as 50i, on a currently produced 50i (and 60i compatible) TV set CUR as 50i, and on a modern 24p (and 50i and 60i compatible) TV set MOD as 50i, which TV sets or displays are connected to player or recorder DVDP.

FIG. 2 shows at the left side a known DVD player DVDP with a known 60i disc 60iDVD inserted. The player outputs 60i AV. The right side depicts how the 60i disc content is presented: no presentation on the old-fashion TV set OLD, on the currently produced TV set CUR it is presented as 60i, and on the modern TV set MOD as 60i, which TV sets or displays are connected to player or recorder DVDP. The only restriction may result from a region code on the disc.

FIG. 3 shows at the left side a known 24p DVD player DVDP24p with a known 24p disc 24pDVD32FL inserted that includes 3:2 pull-down flags. The player outputs 24p or 60i AV. The right side depicts how the 24p or 60i disc content is presented: no presentation on the old-fashion TV set OLD, on the currently produced TV set CUR it is presented as 60i, and on the modern TV set MOD as 24p, which TV sets or displays are connected to player or recorder DVDP24p.

DVD players do not support 24p playback. But if DVD would support 24p playback, then FIG. 4 shows at the left side such a 24p DVD player DVDP24p with a 24p disc 24pDVD inserted that has no 3:2 pull-down flags. The player outputs 24p AV. The right side depicts how the 24p disc content is presented: no presentation on the old-fashion TV set OLD and on the currently produced TV set CUR, but on the modern TV set MOD it is presented as 24p.

EP 04300722.8 describes 24p disc replaying using 3:2 pull-down for 60i presentation and 24:1 pull-down for 50i presentation. However, the video field repetition in 50i presentation can lead to jerks during scenes with strong motions, which was previously unknown to viewers in 50i countries.

PCT/EP2004/012483 describes 24p disc replaying for 50i presentation whereby the disc is replayed such that audio is presented with its original pitch but video fields or frames are inserted adaptively so as to cause minimum visible motion judder.

EP 04006792.8 describes 24p disc replaying for 50i presentation whereby the video is replayed faster by a factor of 25/24 and part of the audio is dropped in order to achieve upon reproduction on average the original audio pitch. The dropping is controlled by a marking information signal. However, such audio frame dropping can lead to stumbles during harmonic audio phases.

INVENTION

Content providers would prefer providing single-picture-frequency single-audio-speed AV discs that can be replayed in most parts of the world. Of course, this won't work for all discs sold worldwide because of the need of providing audio in diverse languages and there is not enough memory available on e.g. one DVD disc to store all audio languages together with the video.

However, new disc formats like HD-DVD or Blu-ray provide more disc capacity for the AV content. Blu-ray recorders are on the Japanese market since April 2003.

Also, more and more new TV sets in the market are able to process and to present even 24p format video.

A problem to be solved by the invention is to provide a 24p format storage medium, and a corresponding storage medium player, the AV content of which can be presented with a high subjective video and audio quality on 50i, 60i and 24p format displays/loudspeakers or TV receivers worldwide. This problem is solved by the method disclosed in claim 1. An apparatus that utilises this method is disclosed in claim 2.

As mentioned above, different audio 'speeds' are required for different countries. Because today's AV storage media use compressed audio streams a simple speed shift by automatic pitch conversion of the audio stream is not feasible. The player would need to decode the audio stream, to carry out a pitch conversion, and to re-encode or re-compress the audio stream to deliver appropriate standardised digital audio streams to external audio decoders, for all channels. This would lead to unacceptable expensive disc players because of the additional hardware requirements for decoding and encoding different audio stream code types (e.g. DTS, AC-3, MPEG), and because of additional license costs for the audio re-encoding.

According to the invention, in the media player or recorder either audio signal frames are dropped adaptively (A-drop) and/or video fields or frames are repeated adaptively (V-repeat), depending on the current video and audio content. The dropping and the repetition depend on the current content of the video and audio signals such that the signal where a dropping or a repeating, respectively, is more perceptible controls the synchronisation between the video and audio signals for their common presentation. Sometimes, separated AV stream pieces are available to provide the best quality.

Repeating special video fields or frames and dropping special audio frames leads to a synchronised AV stream, which is compatible for a display/loudspeakers set or a monitor or a TV set which can not process or present 24p content with 24p or 60i speed.

Thereby the user can play back the disc content in the highest picture and audio quality as is possible by his display or TV set. The playback quality limitation does not depend on the disc content format but on the user's type of display. Advantageously, nearly no additional hardware is required in the player or recorder.

The disc or storage medium contains the original 24p video and appropriate coded audio data facilitating original playback speed, with additional information being medium-stored or player-generated about specific audio signal frames or blocks and about specific video signal frames or fields:

The original AV data is used to playback the content for a 24p compatible display/loudspeakers or TV set, thereby achieving the best picture quality.

Known 3:2 pull-down information or data items embedded in the AV data stream are used to playback the AV stream for a 60i display/loudspeakers or TV set, e.g. special flags in the MPEG video stream as applied for 60i DVD Video discs.

Special A-drop and V-repeat information or data items are used to playback the AV stream for a 50i display/loudspeakers or TV set, whereby the resulting average playback speed of the 24p AV stream on a 50i TV set or display/loudspeakers is somewhere between 48i and 50i speed and is variable within that range.

In principle, the inventive method is suited for replaying together a video signal and one or more audio signals related to audio/video data that are based on 24 Hz video frame frequency for said video signal and an audio signal speed corresponding to said 24 Hz frame frequency, including the steps:

if said video signal is to be presented corresponding to said 24 Hz frame frequency, processing said video and audio data corresponding to said 24 Hz frame frequency for the common presentation;

if said video signal is to be presented corresponding to a 60 Hz or nearly 60 Hz field frequency, processing said audio data with a speed corresponding to 24 Hz or nearly 24 Hz frame frequency for the common presentation, and processing said video data corresponding to a 60 Hz or nearly 60 Hz field frequency using a 3:2 pull-down for the common presentation;

if said video signal is to be presented corresponding to a 50 Hz or nearly 50 Hz field frequency, when processing said audio data and said video data for the presentation, adaptively dropping audio signal frames and/or adaptively repeating video fields or frames, said dropping and/or repeating depending on the current content of said video and audio signals such that the signal where a dropping or a repeating, respectively, is more perceptible controls the synchronisation between said video and audio signals for the common presentation.

In principle the inventive apparatus is suited for replaying together a video signal and one or more audio signals related to audio/video data that are based on 24 Hz video frame frequency for said video signal and an audio signal speed corresponding to said 24 Hz frame frequency, said apparatus including a controller which controls processing means for said audio and video data as follows:

if said video signal is to be presented corresponding to said 24 Hz frame frequency, said processing means process said video and audio data corresponding to said 24 Hz frame frequency for the common presentation;

if said video signal is to be presented corresponding to a 60 Hz or nearly 60 Hz field frequency, said processing means process said audio data with a speed corresponding to 24 Hz or nearly 24 Hz frame frequency for the common presentation, and said processing means process said video data corresponding to a 60 Hz or nearly 60 Hz field frequency using a 3:2 pull-down for the common presentation;

if said video signal is to be presented corresponding to a 50 Hz or nearly 50 Hz field frequency, when said processing means process said audio data and said video data for the presentation, said processing means adaptively drop audio signal frames and/or adaptively repeat video fields or frames, said dropping and/or repeating depending on the current content of said video and audio signals such that the signal where a dropping or a repeating, respectively, is more perceptible controls the synchronisation between said video and audio signals for the common presentation.

Advantageous additional embodiments of the invention are disclosed in the respective dependent claims.

DRAWINGS

Exemplary embodiments of the invention are described with reference to the accompanying drawings, which show in:

FIG. 1 known 50i disc content presentation on different format TV sets;

FIG. 2 known 60i disc content presentation on different format TV sets;

FIG. 3 known 24p and 3:2 pull-down flags disc content presentation on different format TV sets;

FIG. 4 known 24p without 3:2 pull-down flags disc content presentation on different format TV sets;

FIG. 5 inventive 24p disc content presentation on different format TV sets using 3:2 pull-down flags, A-drop flags and V-repeat flags;

FIG. 6 known 24p/50i format presentation;

FIG. 7 presentation movie time $t_{movie}$ versus real-time $t_{real}$;

FIG. 8 distances of the presentation speed of the movie in comparison to the original speed;

FIG. 9 example authoring of a 24p AV record part with video and audio signal characteristics that can be evaluated for the generating appropriate a-d and v-r flags;

FIG. 10 example distribution of a-d and v-r flags along that video sequence and the related audio signal;

FIG. 11 difference between stream recording order and playback order;

FIG. 12 more detailed temporal relations when playing back a 24p AV stream as a 50i AV stream;

FIG. 13 arrangement of a-d and v-r flags in an AV stream that has a structure similar to the DVD Video VOB structure;

FIG. 14 an implementation different to that of FIG. 13;

FIG. 15 combinations of flag settings and the resulting video output, i.e. how many times fields or frames are repeated, for MPEG-2 and MPEG-4 AVC;

FIG. 16 combinations of flag settings and the resulting video output, i.e. how many times fields or frames are repeated, for VC-1;

FIG. 17 flow diagram for 50i presentation of a 24p AV stream;

FIG. 18 flow diagram for 50i presentation of a 24p AV stream showing the control of the stream data before it is sent to the actual video decoder;

FIG. 19 flow diagram representing the 24p, 50i, and 60i video presentation of a 24p video stream;

FIG. 20 inventive video stream player;

FIG. 21 presentation of video and audio in comparison to the decoded data of the disc;

FIG. 22 playback of a 24p/60i-specific or a 50i-specific Program Chain for a very critical scene.

EXEMPLARY EMBODIMENTS

FIG. 5 shows an inventive disc player DVDPl with an inventive 24p disc 24pDVD32FLAVFL inserted that includes 3:2 pull-down flags as well as a-d and v-r flags as explained below. The player outputs 50i, 60i or 24p AV according to the best possible presentation mode on any connected TV receiver or display. The 24p disc content is presented on the old-fashion TV set OLDF as 50i AV, on the currently produced TV set CUR as 50i or 60i AV according to a user's selection, and on the modern TV set MOD as 24p AV.

The following description for the adaptive A-drop and V-repeat includes three related sections. Section A describes the theoretical principles and background of presenting 24p format content continuously in 50i format. Section B describes the above-mentioned additional information or data items that are arranged e.g. on the disc and are required for the inventive 50i presentation. Section C describes some more detailed requirements for the storage of some known video stream types like MPEG-2, MPEG-4 and VC-1.

A) Theoretical Principles and Background of Presenting 24p Format Content Continuously in 50i Format The playback of 24p on a 50i display without carrying out any video/audio speed conversion would lead to a loss of synchronisation between audio and video because the video playback is realised as 50i (25p) instead of 48i (24p), i.e. 4.2% faster than the original speed, but the audio play back is in original speed.

FIGS. 6 to 8 show what happens along the time axis. The sawtoothes of the video presentation in FIGS. 7 and 8 result from the fact that each presented field or frame is a time spot of the real scene, i.e. it is a still picture for every 1/24 second period. The audio data, however, has a time-continuous representation function. A single audio frame contains continuous audio, i.e. not only a single spot on the time axis.

FIG. 6a describes the original 24p format presentation with successive frames f0 to f25. FIG. 6b shows the known DVD Video presentation of a 50i disc on a 50i TV set, wherein e.g. 't0' means 'top field of frame 0' and 'b0' means 'bottom field of frame 0', so that the average video presentation speed is 4.2% faster than original speed. FIG. 6c shows a 24:1 field pull-down, i.e. every 24th field of the original 24p stream is repeated, so that the average video presentation speed is equal to the original speed.

FIG. 7 shows the axis for the movie time $t_{movie}$ versus the axis for the real-time $t_{real}$. The real presentation hardware watch at the front of the TV indicates the real-time whereas the clock in the video data itself (i.e. the recorded watch) represents the movie time. The stairs in the diagram show the relation between the real presentation time of the video fields (real-time) and the time they represent in the presented scene (movie-time). Because of the slowness of the human eye the presentation of the sawtoothes appears as a smooth video, i.e. the human eye percepts a linear and smooth video presentation without jerks. Anyway, the audio is continuously presented, independent of the speed (either original speed or 4.2% faster), therefore a straight line represents the audio time function. For simplification, a special presentation of the functions is introduced in FIGS. 7b and 7c showing the functions of the upper part minus the function $t_{real}(t_{movie})=t_{movie}$. In this kind of diagram a horizontal line would mean an ideal function without any delays or leads in comparison to the original speed. An increasing function represents a faster presentation of the movie in comparison to the original speed. A decreasing function represents a slower presentation of the movie in comparison to the original speed.

FIG. 8 uses only that kind of diagram presentation for video and audio. Note that the vertical lines of the presentation functions do not represent the real duration of a video presentation but only indicate the link between the last presented video piece (time=$t_0$) and the next presented video piece (time=$t_1$>$t_0$).

FIG. 8a shows the cinema version of the movie presentation, i.e. with original speed. Even in this original version sawtoothes exist because the presented frames are still discrete time spots of ¹⁄₂₄ s periods.

A presentation according to FIG. 8b would be the ideal transformation from the 24p to the 50i format. But, neither is such transformation feasible in a perfect way nor is it economical for the content provider because it would require too much computer power and additional work by a human operator.

FIG. 8c depicts 4.2% faster playback of video but original audio speed, and shows that audio and video would loose synchronisation.

FIG. 8d depicts the solution for current DVD Video discs, i.e. 4.2% faster playback of video and audio in the 50i format. The authoring of such an AV stream has already performed a conversion of the original audio stream during authoring to a 4.2% faster audio stream. Therefore audio and video are well synchronised, but such a disc is not playable in original audio and video speed with currently available external audio decoders due to the non-standardised audio speed.

FIG. 8e shows a video output with 4.2% faster speed but the presented audio frames in original speed. By dropping some audio frames the normal-speed audio becomes synchronised with the faster-speed video presentation. This is described in EP 04006792.8.

FIG. 8f shows the other way around. Some video fields are repeated by 24:1 pull-down to slow down the video presentation to original speed, whereby the audio is encoded and played back in original speed. This is described in PCT/EP2004/012483 and EP 04300722.8.

FIG. 8g uses a combination of the FIG. 8e and FIG. 8f processings and explains the inventive processing—some audio frames are dropped and some video fields are repeated. The resulting average presentation speed can be controlled to be somewhere between original speed and 4.2% faster playback. Special audio-drop (a-d) and video-repeat (v-r) indicators or flags are assigned to the AV stream. Preferably the content provider puts this information on the disc during authoring, i.e. the playback device does not need to calculate such flags in which case the related necessary player hardware or software becomes simpler and cheaper.

The a-d and v-r indicators can be flags:
each a-d flag indicates a special audio frame of a single audio stream (e.g. AC-3) or several parallel audio streams (e.g. LPCM, DTS, AC-3 and MPEG);
each v-r flag indicates a special video field in the case of a field-encoded video stream, or a special video frame in the case of a frame-encoded video stream.

The decoder of the playback device uses these flags during playback to synchronise the 4.2% faster 50i playback of the video device with the original-speed audio stream. That synchronisation is carried out by repeating appropriate video fields or frames and by dropping appropriate frames or transform-related blocks of the audio stream. The a-d and v-r flags or indicators lead to a slow-down of the video playback speed and a speed-up of the audio playback speed. Advantageously, the dropping of whole audio frames keeps the audio pitch, i.e. a pitch conversion is not necessary. Advantageously, the related video fields/frames and the audio frames/blocks can be identified in a simple way in most stream formats, like MPEG, AC-3, and DTS. Therefore no additional decoding or encoding processing and no additional licenses are required to detect these fields/frames/blocks.

In practise, the video stream playback speed $V_V$ is decreased from 50i closer to 48i (48i≦$V_V$≦50i) and the audio stream playback speed $V_a$ is increased from 48i closer to 50i (48i≦$V_a$≦50i) with the result that on average $V_V$ is equal to $V_a$ (however, there may occur small possible time gaps at the beginning and at the end of a playback). $V_a$ and $V_V$ may (and frequently will) vary inside the AV stream. With other words, the resulting average playback speed of the 24p AV stream on a 50i TV set or display/loudspeakers is somewhere between 48i and 50i, i.e. the average playback speed is increased by between 0 and 4.2%. Locally, during short time periods, the video or audio speed can be slower than 48i and faster than 50i.

The most appropriate video fields/frames for repeating and the most appropriate audio frames for dropping can be found as follows:
Preferably, the authoring tool selects video fields or frames for repeating (v-r flags) which include small motion speeds only in the picture content, because in such scenes repeated video fields or frames are merely or even not visible.
Preferably, the authoring tool selects video fields or frames for repeating (v-r flags) at the end of a scene or at the beginning of a new scene or in dark scenes, e.g. during repeated black screens of a scene cut.
Preferably, the authoring tool selects audio frames for dropping (a-d flags) which include less harmonic audio, low volume, no lip-synchronic parts, and/or noise-like audio periods, because in such scenes the dropping of audio frames/blocks is merely or even not perceptible.
Four kinds of scenes exist:
scenes which are suitable for video field/frame repeat and for audio frame drop (VAS);
scenes which are suitable for video field/frame repeat, but not for audio frame drop (VaS);
not suitable for video field/frame repeat, but for audio frame drop (vAS);
neither suitable for video field/frame repeat nor for audio frame drop (vaS).

Many scenes do not need exact synchronisation, for example scenes of landscape video with background music. In such scenes the cuts between two scenes may repeat some black video frames to get synchronised with the audio (i.e. video 50i, but audio 48i). Furthermore, most scenes are of the types VAS, VaS, or vAS.

Scene cuts can be used as well for synchronisation.

Preferably, audio frame dropping and video field/frame repeating is homogenously used for VAS scenes, resulting in audio & video ~49i.

Video field/frame repetition is preferred for VaS scenes, resulting in audio & video ~48i.

Audio frame dropping is preferred for vAS scenes, resulting in audio & video ~50i.

The case vaS occurs rather seldom, e.g. lip synchronic scenes with harmonic music like violins. Therefore video field/frame repetitions and audio frame dropping is not applied in such scenes.

Preferably the authoring tool takes care of a sequence of different scene types, e.g. VaS, vaS, vAS. A less critical scene (VAS, VaS, vAS) neighbouring a critical scene (vaS) is used to reduce or avoid annoying jerks and audio drops during the critical scene. For example, the authoring tool provides a time lead of the video playback in front of a vaS scene and a time lead of the audio playback at the end of this vaS scene. This reduces video jerks and audio stammers as far as possible. Scene cuts during critical vaS scenes should also be used for reducing or eliminating the need of v-r and a-d flags during the critical scene.

The necessary video field/frame repeat and audio frame drop flags should be placed as frequently as possible in scene cuts and as less frequently as possible in vaS scenes.

If there are very critical scene parts, for such special AV stream parts different AV stream pieces may be used. For example, different Program Chains (as it is called in DVD Video) may be used for 50i presentation and for 24p/60i presentation: For the very critical scenes these Program Chains use their own separate AV stream parts stored on the medium. An example is shown in FIG. 22. The upper horizontal arrow shows which parts of the AV stream are used for 24p or 60i playback. The horizontal arrow below it shows which parts of the AV stream are used for 50i playback. The rectangular area below these arrows shows the AV stream data as it has been recorded on the disc, e.g. the consecutive sectors of a DVD Video VOB file. In DVD Video such different presentation is facilitated by Program Chains, i.e. it is similar to multi-angle presentation in DVD Video. The main partitions of the AV stream are commonly used for 24p, 60i and 50i playback. To common-part AV stream items specific 24p/60i AV stream items and specific 50i AV stream items are attached. For 24p/60i playback the common AV stream parts and the specific 24p/60i AV stream items are replayed whereas for 50i playback the common AV stream parts and the specific 50i AV stream items are replayed. For such purpose navigation or higher-level information (e.g. .IFO files in DVD Video) is adapted to handle this feature. Such a solution provides maximum flexibility for all available TV sets or displays/monitors/audio equipment devices and therefore a maximum presentation quality in view of minimum additionally required memory capacity on the storage medium.

B) Where and How Should the 3:2 Pull-down, a-d and v-r Flags be Stored?

There are several possible locations. The preferred location is inside the AV stream itself, i.e. the flags are part of the AV stream as it is already used for 3:2 pull-down flags in MPEG Video streams. For special applications it may be useful to apply a location outside the AV stream. Such special applications may be a special player device, which plays back a known 3:2 pull-down 60i DVD Video based on progressive-source 24p video by applying an additional external information data block containing the location information of the a-d and v-r flags for this 60i DVD Video disc to convert this AV stream for a 50i device. This information data block may be delivered via Internet from a special provider.

FIG. 9 shows an example authoring of a 24p AV record part with video and audio signal characteristics which can be evaluated for the generating of appropriate a-d and v-r flags.

FIG. 9a shows the degree of motion in a video sequence, e.g. a camera pan, little motion and fast background motion, and several scene cuts. The camera pan generates a strong motion, i.e. a high degree of motion. During strong motions video field/frame repetitions should be avoided if possible. If background only is moving strongly the degree of motion is high, too.

Figure 1:
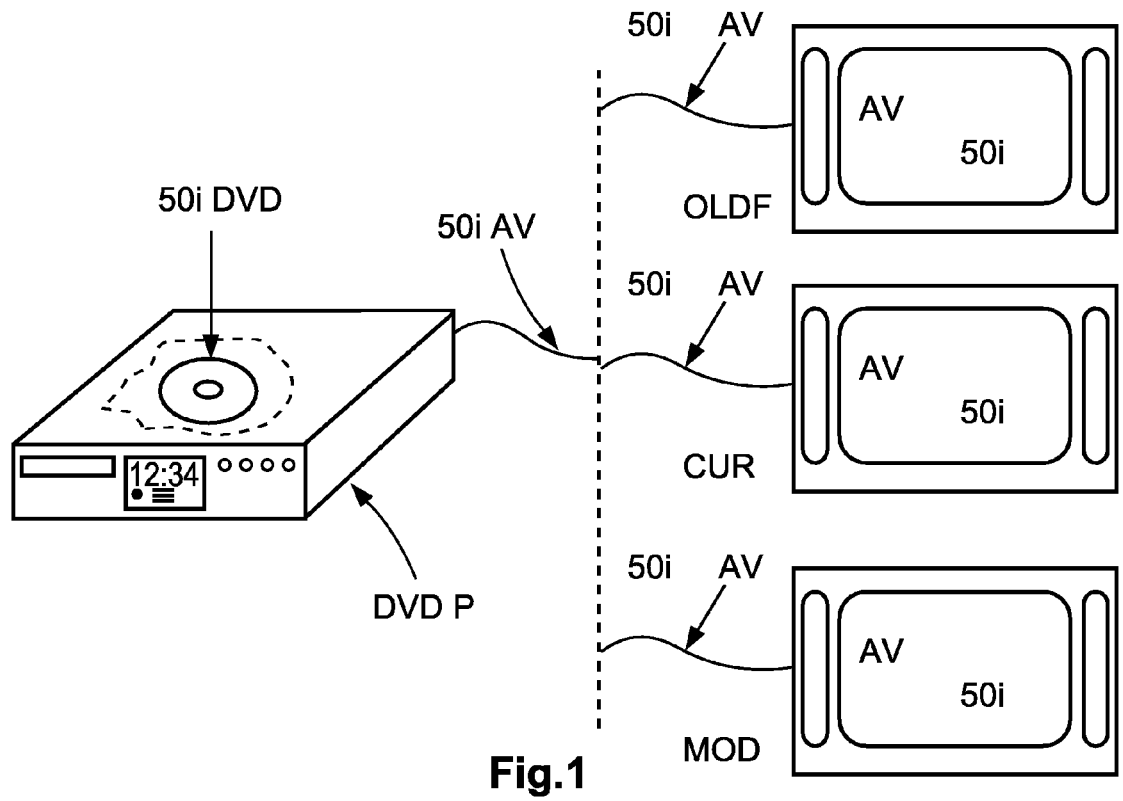
Figure 2:
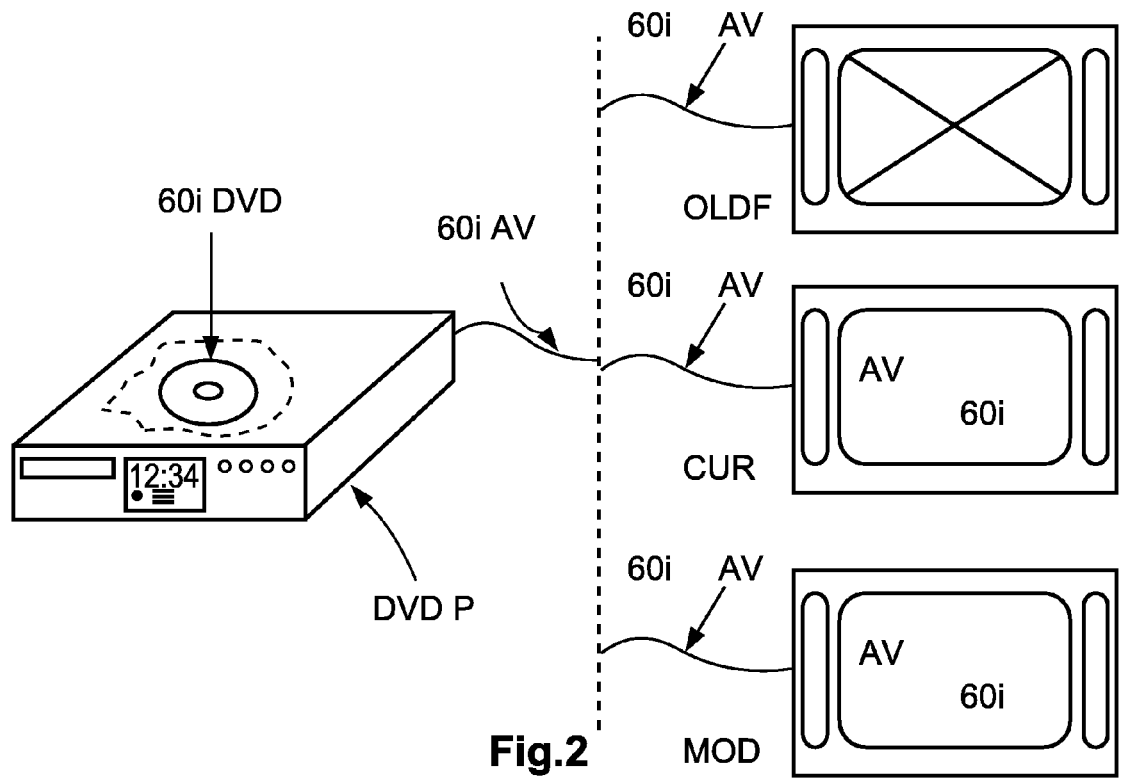
Figure 3:
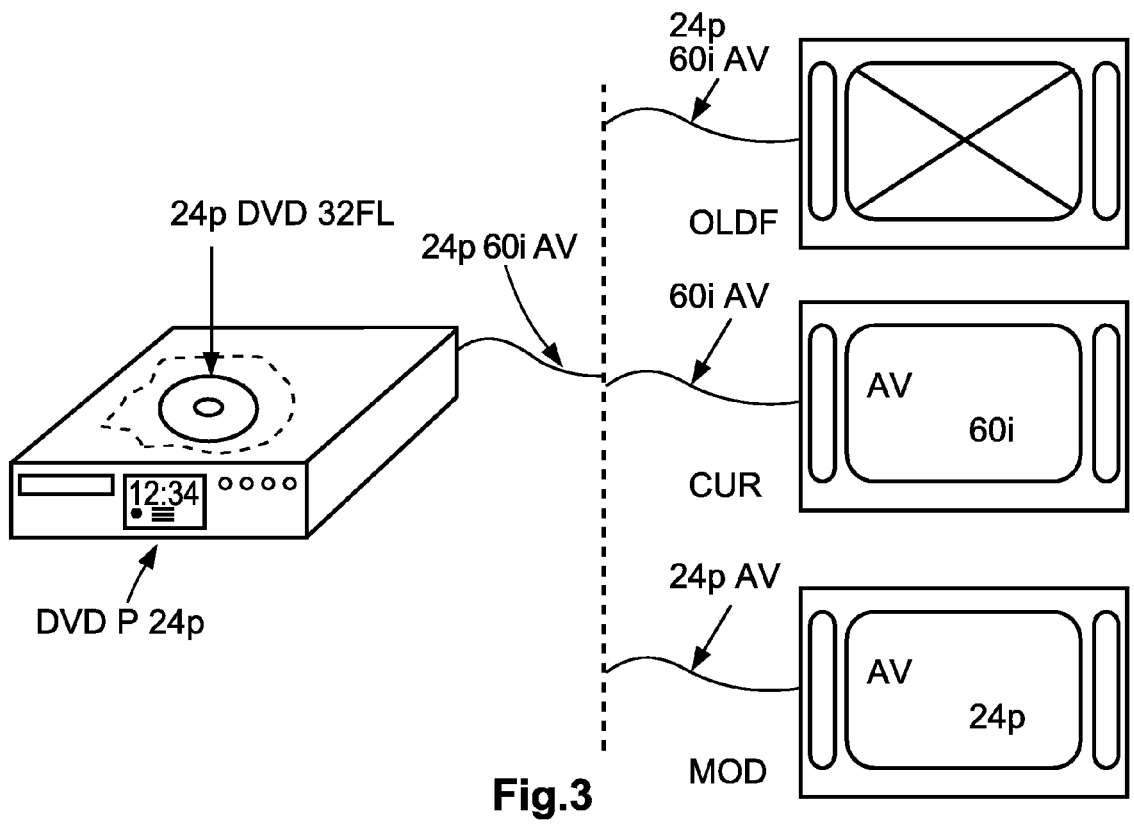
Figure 4:
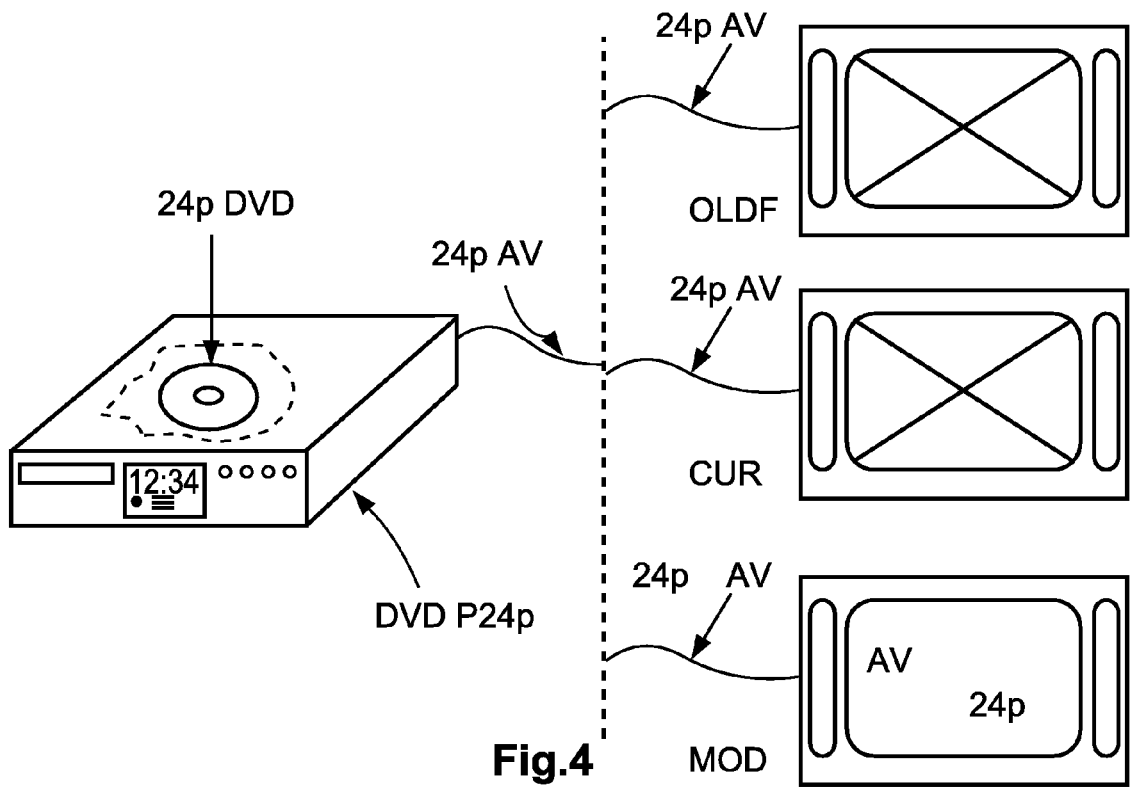
Figure 5:
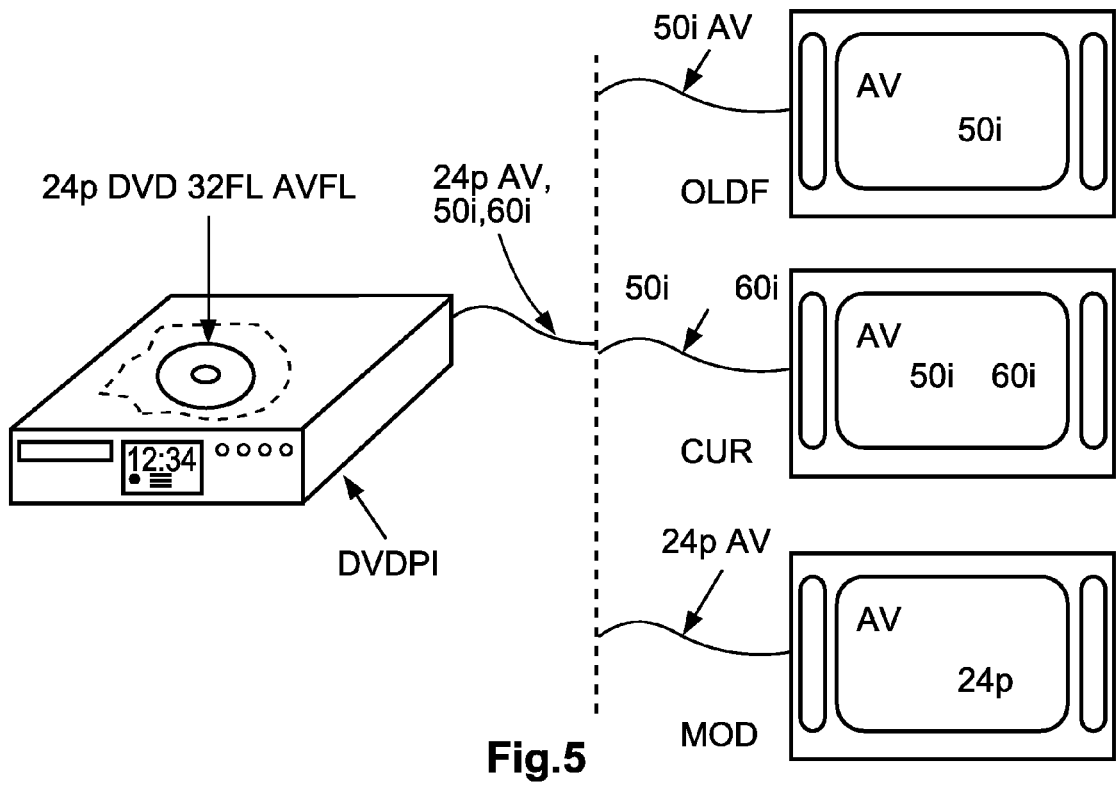
Figure 6:
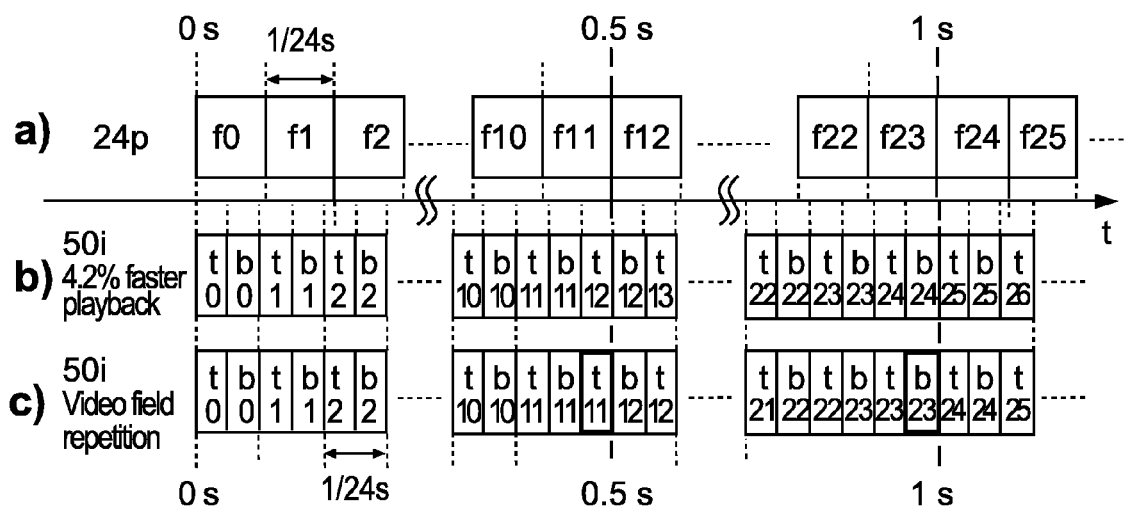
Figure 7:
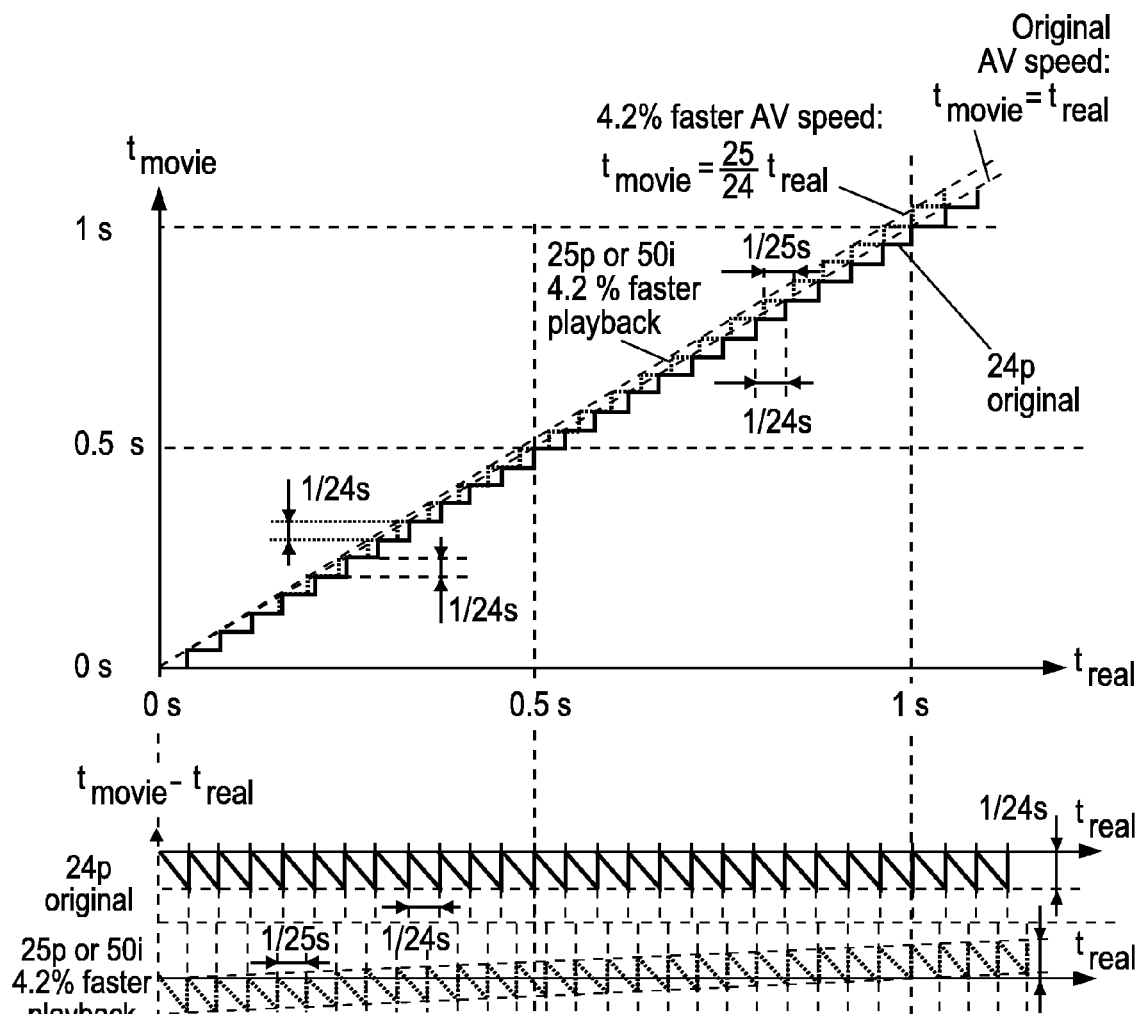
Figure 22:
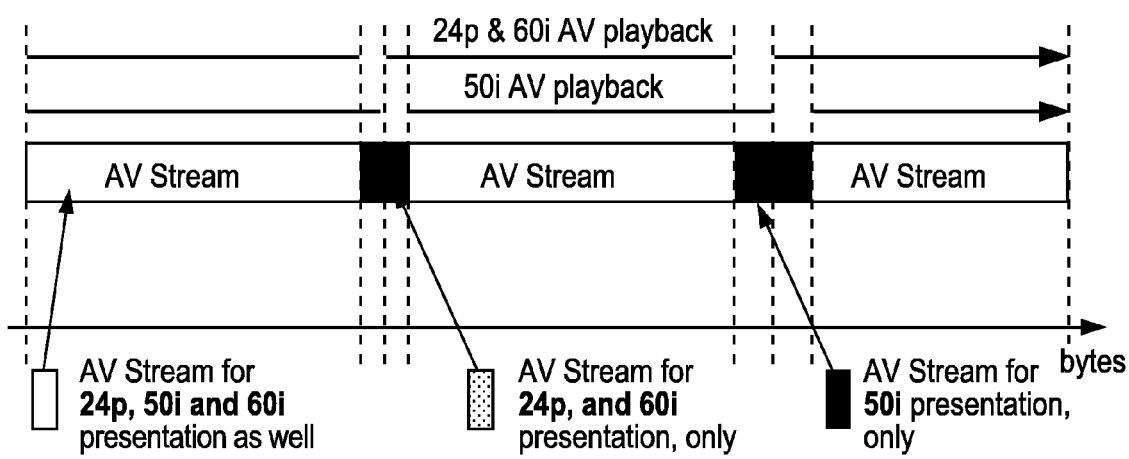
Figure 8:
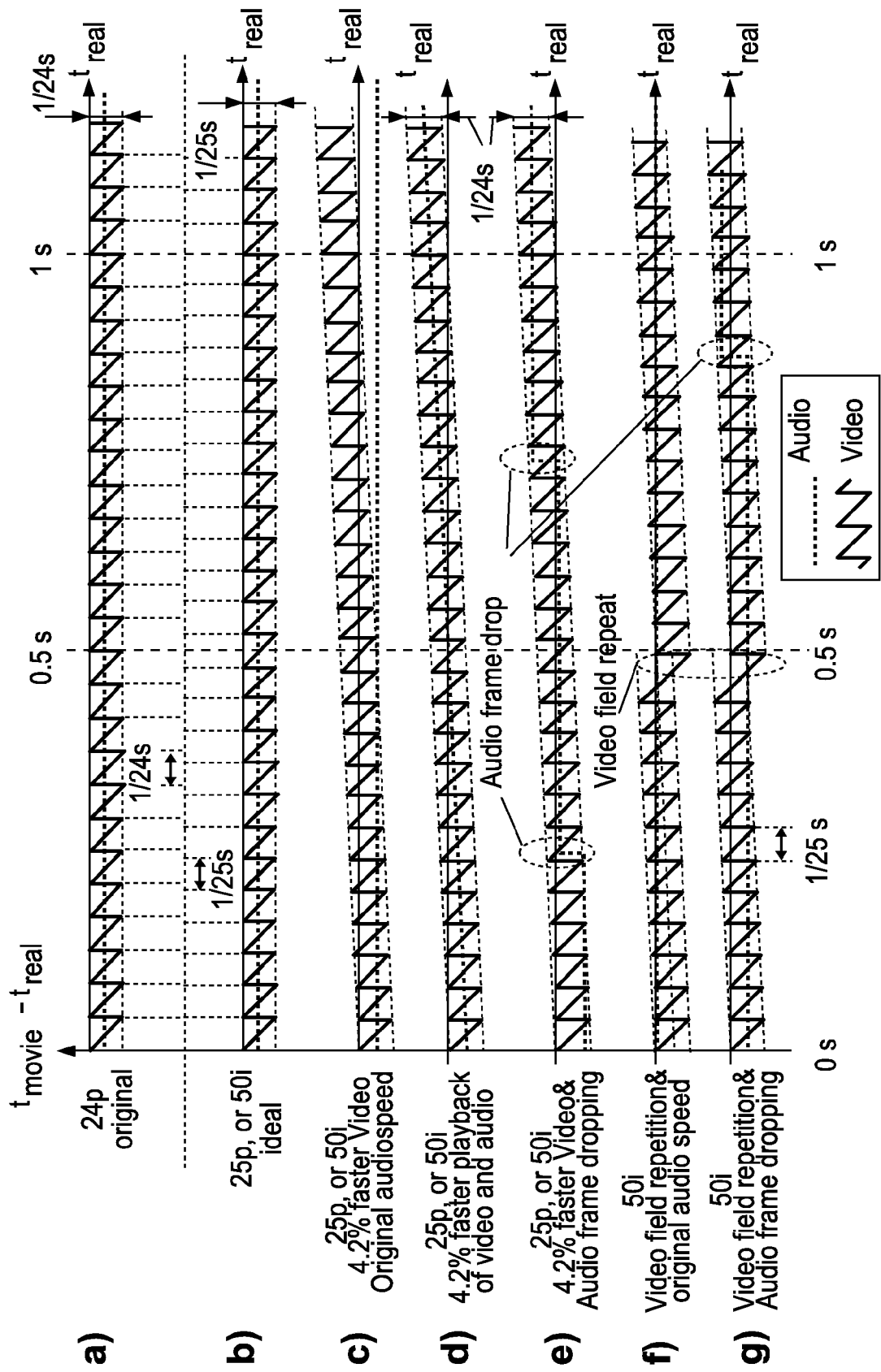

The characteristics mentioned in FIGS. 9a to 9c, i.e. the special properties of the AV content, can be produced by a human operator or by an automatic image analysing software. FIG. 9d indicates the resulting AV presentation for a 50i TV set. The sawtoothes of the real video function are replaced by a smoothed function to simplify the drawing. Thereby this simplified video function is directly comparable with the related audio function.

Audio and video are not completely synchronised during the whole record time depicted. Parts where there is no need to keep audio and video synchronised are encoded such that sound and video looks best. Only for the periods that need synchronisation video field repetition and audio frame dropping are applied. Furthermore, scene cuts and muted scenes are used to keep and/or restore the synchronisation. The authoring tool sets the appropriate a-d and v-r flags to get the desired time functions of audio and video.

Figure 9:
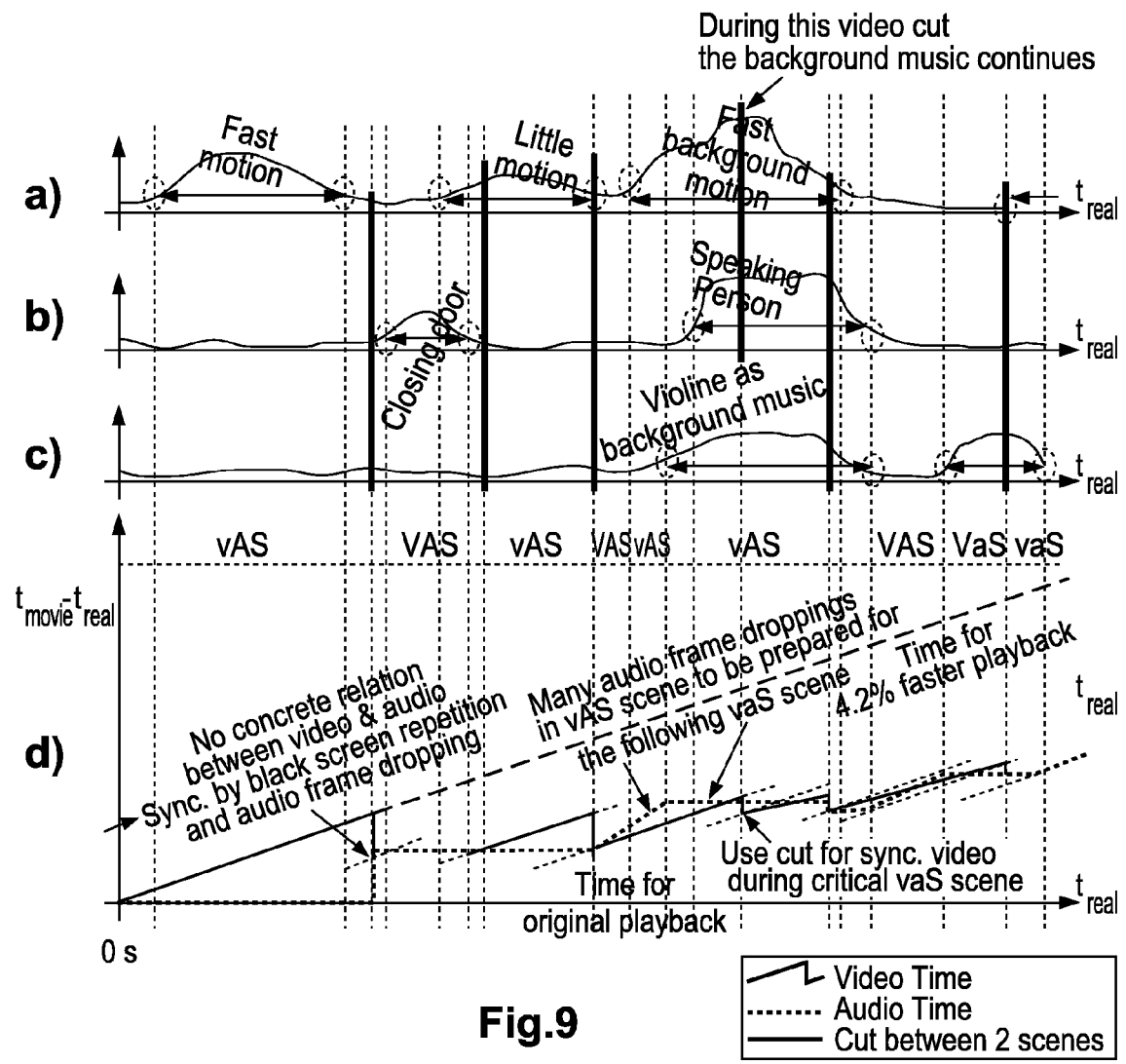
FIG. 9b shows the degree of correlation between the video signal shown and the audio signal assigned thereto. The audio signal includes a door closing noise and the speech of a person, which both represent a strong correlation in which case audio and video should be kept as synchronous as possible.
FIG. 9c shows the degree of harmonic level of the audio, including a violin as background music representing a high degree of harmonic level. Audio drops should be avoided in such scenes.
Figure 10:
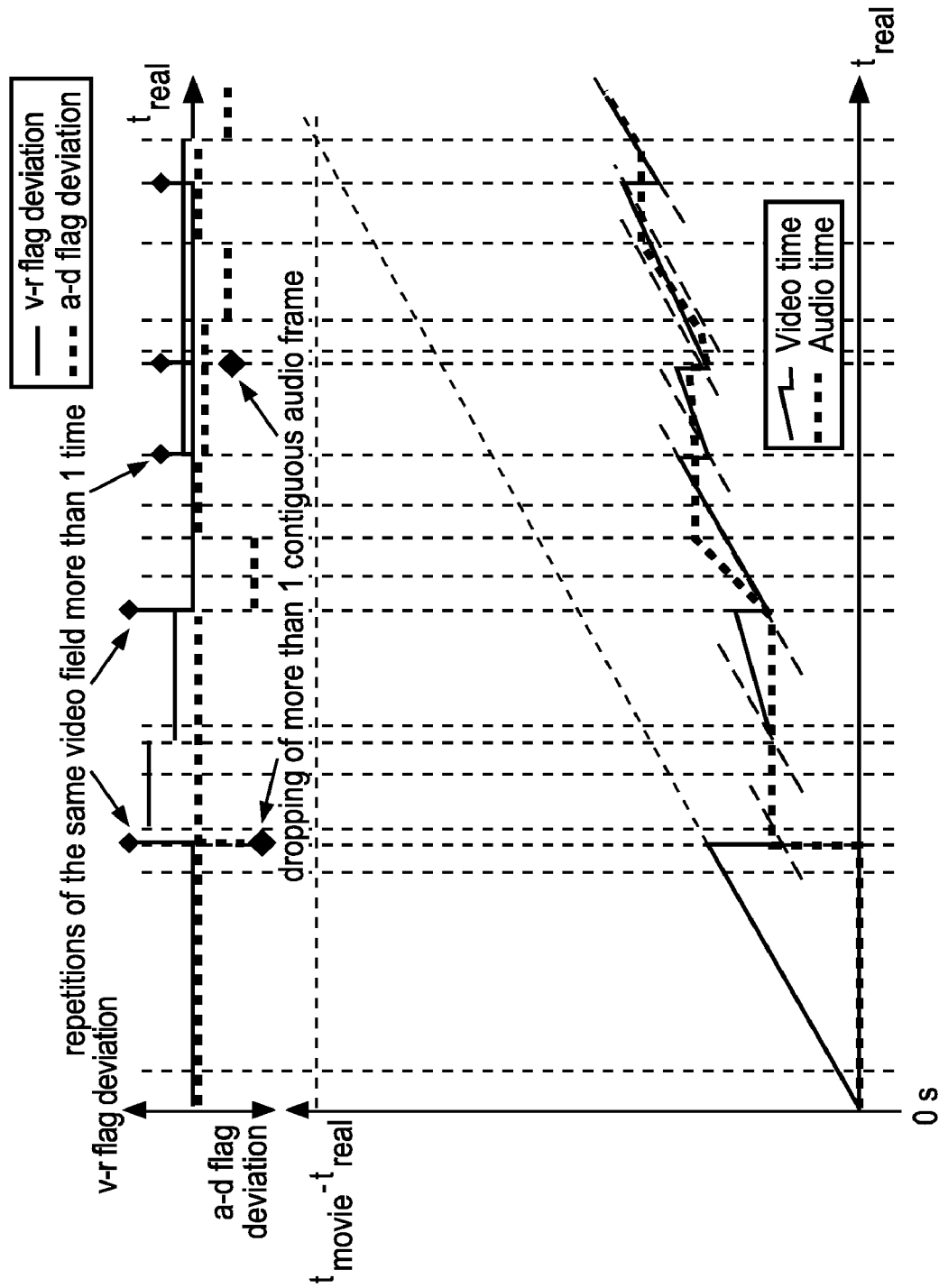

A corresponding example derivation of the a-d and v-r flags is shown in FIG. 10 based on FIG. 9. The lower part of FIG. 10 repeats the time functions FIG. 9d. The upper part indicates the location of the corresponding a-d and v-r flags. At the first, third, fourth, fifth and sixth scene cuts more than one field (or frame) is repeated which is denoted by the symbol '♦' in the v-r flag function. Between the first and third scene cuts, in a first part the rate of v-r flags per time unit is such that the video speed corresponds to 48i whereas in a second part the rate of v-r flags per time unit is such that the video speed corresponds to about 49i. From the fourth and beyond the sixth scene cut the rate of v-r flags per time unit is such that the video speed corresponds to a bit less than 49i. In the remaining parts, i.e. the '50i parts', of the video sequence there are no v-r flags, or the v-r flags are set to '0'.

At the first and fifth scene cuts more than one audio frame (or block) is dropped which is denoted by the symbol '♦' in the a-d flag function. Between the third and fourth scene cuts, in a first part the rate of a-d flags per time unit is such that the audio speed corresponds to more than 50i. Between the fourth and sixth scene cuts, the rate of a-d flags per time unit is such that the audio speed corresponds in a first part to a bit more than 48i, in a second part to a bit more than 50i, and in a third part to 48i. In the remaining parts, i.e. the '48i parts', of the audio signal there are no a-d flags, or the a-d flags are set to '0'. Preferably each a-d flag is valid for all audio streams (DTS, AC3, MPEG, . . . ), but it is possible that for short time periods differently arranged a-d flags are used for the other audio streams.

If the AV stream itself is used as location for the a-d and v-r flags, then the user_data( ) fields in the MPEG stream can be used for this purpose, or information items outside the MPEG stream data but still in the AV stream indicate the appropriate video fields/frames and audio frames. For example, the pack header or the navigation packs of a DVD Video stream could be expanded such that these packs contain the exact locations of the appropriate video fields/frames and audio frames inside the whole video object unit VOBU, to which this navigation pack belongs. Corresponding examples are shown in FIGS. 13 and 14.

Figure 13:
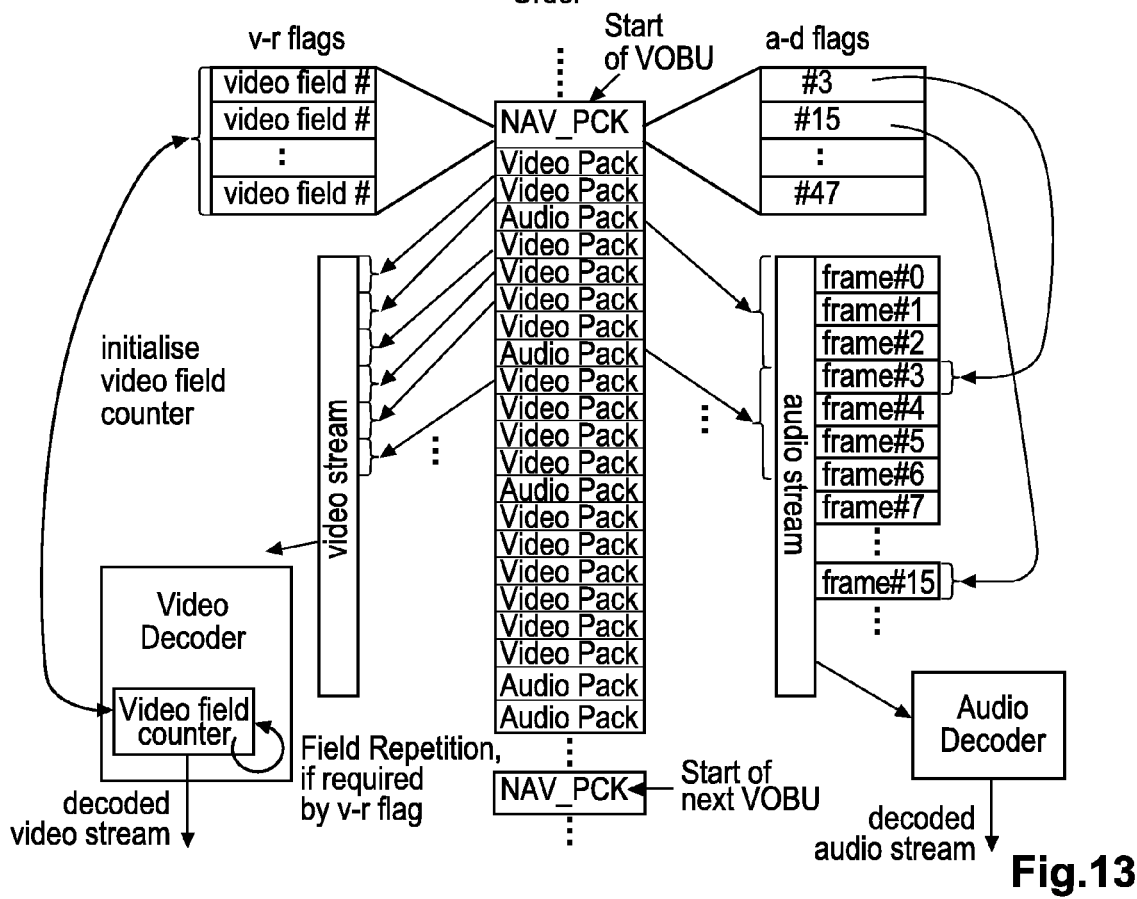

FIG. 13 describes an embodiment of implementing a-d and v-r flags in an AV stream that has a structure similar to the DVD Video VOB structure. On the left side a video decoding solution is shown whereas on the right side an audio decoding solution is shown. The a-d and v-r flags of the whole VOBU are stored in the header of the VOBU (navigation pack NV_PCK). The v-r flags form a table of video field or frame numbers which are provided to a post-processing part of the video decoder, a video field or frame counter which counts the decoded fields/frames and controls a repetition of a field/frame as indicated by the status or the presence of the v-r flags. This may be a hardware solution or a combination of a soft- and a hardware solution.

The a-d flags form a table of frame or block numbers of which each one indicates the appropriate frame/block number of the whole audio stream of this VOBU. The audio frames/blocks indicated by the a-d flags are to be dropped for 50i playback which dropping can be performed inside the audio decoder itself, or in the decoder input stream demultiplexer by skipping the appropriate audio frames/blocks. More than one a-d flag table can be used if there are several audio streams (e.g. when decoding LPCM, AC-3 or DTS in parallel) with different frame structures.

Figures 14, 15:
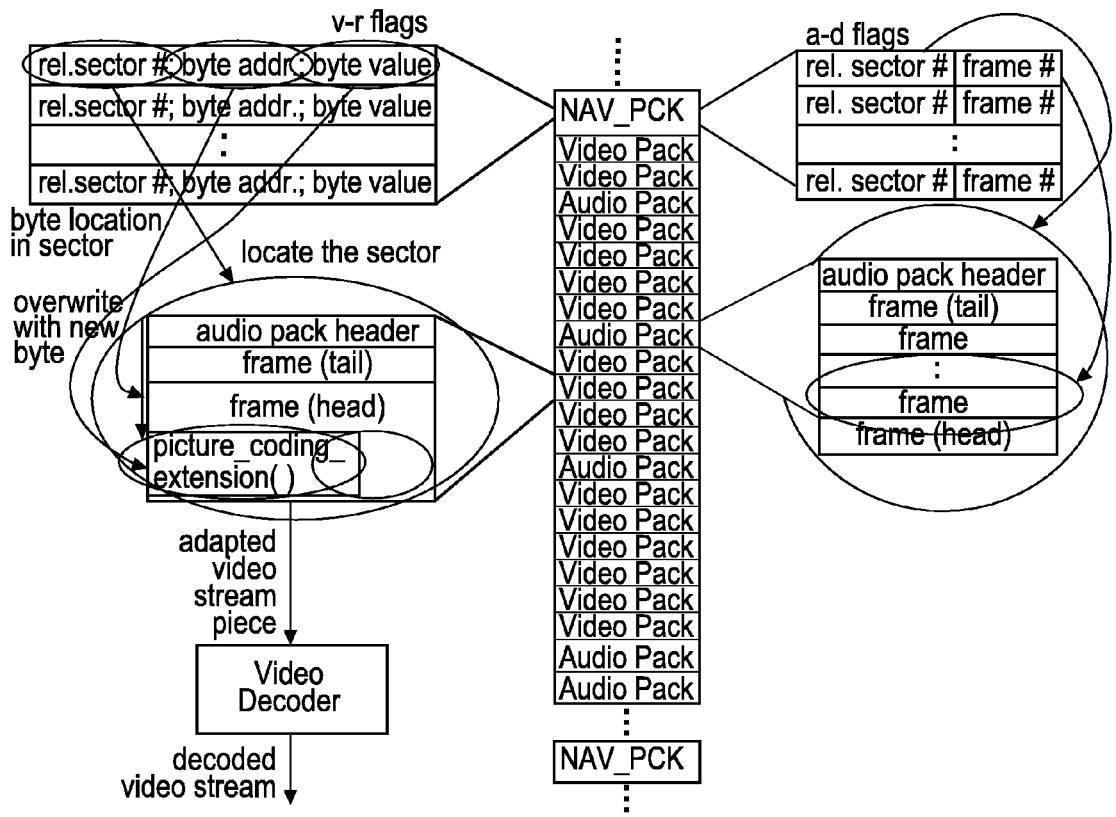

FIG. 14 describes another solution for implementing a-d and v-r flags in an AV stream that has a structure similar to the DVD Video VOB structure. The a-d and v-r flags of the whole VOBU are stored in the header of the VOBU (navigation pack NV_PCK). On the left side, the v-r flags form a table of relative sector numbers, byte addresses and byte values. Each set of such three values represents one v-r flag. The relative sector number addresses the sector in this VOBU. The byte address indicates an exact byte inside this sector. In the case of 50i output, this byte is replaced by the byte value of the v-r flag. This bytes sets the bits top_field_first and repeat_first_field appropriately while the other bits around can be left unchanged. The resulting piece of video stream is sent to the video decoder. This solution significantly simplifies the implementation for current MPEG-2 decoder hardware because the byte replacement can be carried out by a software demultiplexer before sending the video data to the hardware decoder, i.e. the currently available decoder hardware can be used. Thus, the manufacturer whether implementing it as hardware or as software solution. This procedure can also be used for applying 3:2 pull-down flags with an additional table in the navigation pack NV_PCK, whereby the video stream is free from any pull-down flags and the appropriate pull-down flags (3:2 pull-down or as v-r flags) will be inserted during playback in real-time. The other way around is also possible, i.e. 3:2 pull-down flags are already inserted in the stream and during playback the v-r flags remove these 3:2 pull-down flags. A mixture of both is possible, too. This would keep the maximum of required byte replacements as low as possible per VOBU, independent of the selected presentation mode 50i, 60i or 24p. Advantageously this reduces the processor requirements, i.e. simplifies a software implementation of this mode.

As an alternative, the byte replacement for the video stream can be a word replacement instead if the special bits are not located in the same byte.

On the right side, the a-d flags form a table of relative sector numbers and relative frame/block numbers. One a-d flag consist of one relative sector number and one relative frame number. The relative sector number indicates the appropriate sector in this VOBU and the relative frame number the relative number of the frame starting in this sector. This addressed audio frame is dropped which dropping can be performed inside the audio decoder itself, or in the decoder input stream demultiplexer by skipping the appropriate audio frames/blocks. More than one a-d flag table can be used if there are several audio streams (e.g. when LPCM, AC-3 or DTS are stored in parallel on the same disc) with different frame structures.

The examples described in FIGS. 13 and 14 for handling the audio and the video stream can be changed. The best way to mark a-d and v-r flags or data items depends preferably on the selected realisation of the audio and video decoders. For example, if the video decoder is a known MPEG-2 video decoder the input stream demultiplexer delivers a simple MPEG-2 video stream to that hardware decoder, which does not need any additional register settings. On the other hand, an MPEG-2 decoder that can handle special register settings (e.g. registers like ignore_3_2pull_down_flags, or use__a_d_and_v_r_flags_instead_of_3_2 pull_down_flags), simplifies the task of the input stream demultiplexer.

Advantageously, such an expanded navigation pack should also contain the intended $t_{movie}$-axis offset distance between audio and video stream at the beginning time of this video piece, e.g. a VOBU, as explained below (is not shown in FIGS. 13 and 14). That is necessary for processing direct jumps into a title chapter, into an angle switch (in case of multi-angle), into trick modes (e.g. fast forward with audio as provided by some Thomson DVD players) or into the play modus just following a fast forward trick mode. Thereby no special adaptations are necessary to the .IFO file definitions of DVD Video.

The actual continuous playback synchronisation is controlled by the de-multiplex part (demux) of the player or recorder device. This demux part reads the AV stream, i.e.:
  recognises the locations of the a-d and v-r flags, e.g. by reading an expanded navigation pack as described above;
  reads and plays back the video data portions;
  recognises the video fields, which are marked by the v-r flags;
  repeats appropriately these video fields, one or more times, as demanded by the v-r flag;
  reads in parallel the audio data portions;
  plays back the audio frames, except those which are marked by the a-d flags;
  drops such marked audio frames appropriately, one or more times, as demanded by the a-d flag.

If necessary, a start offset between audio and video presentation is applied at the beginning of a presentation, e.g. a playback start after a direct jump into a chapter of the movie. The demux:
  recognises the start time offset between audio and video presentation, e.g. by reading an expanded navigation pack as described above;
  reads the video data portions;

starts with the video presentation if there is no offset to be regarded or if the offset indicates a delayed start for the audio presentation;

reads the audio data portions;

starts with the audio presentation if there is no offset to be regarded or if the offset indicates a delayed start for the video presentation;

starts the remaining stream (audio or video), when the offset time has passed. At this point the presentation is as intended by the authoring, i.e. at this point the above synchronisation ('actual synchronisation') is performed.

Figure 11:
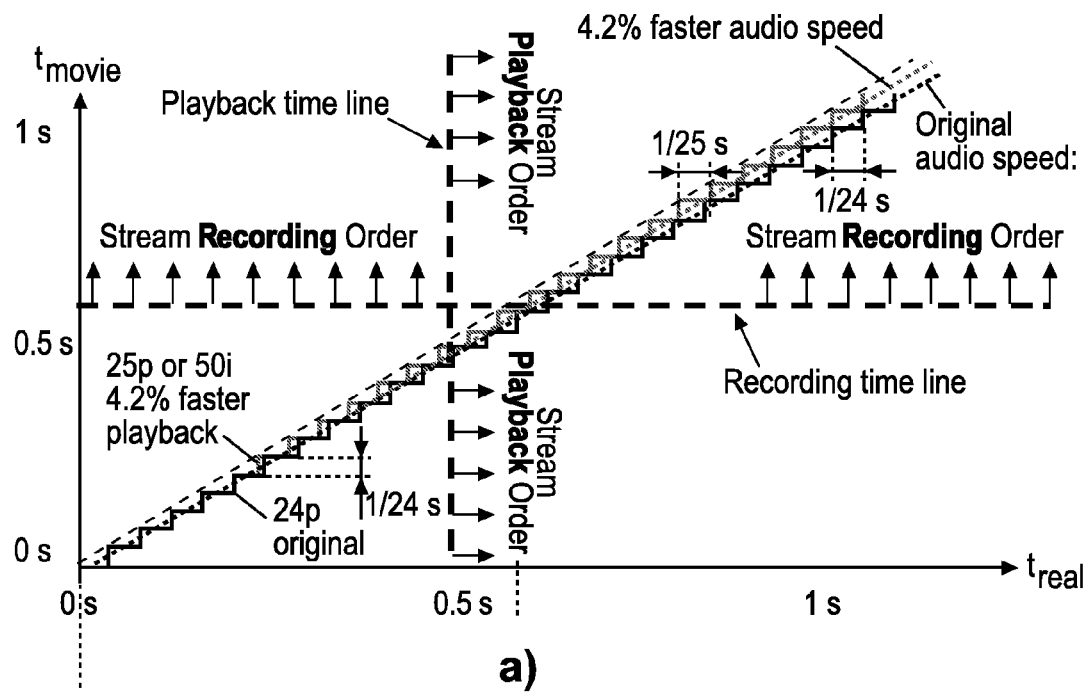
Figure 11:
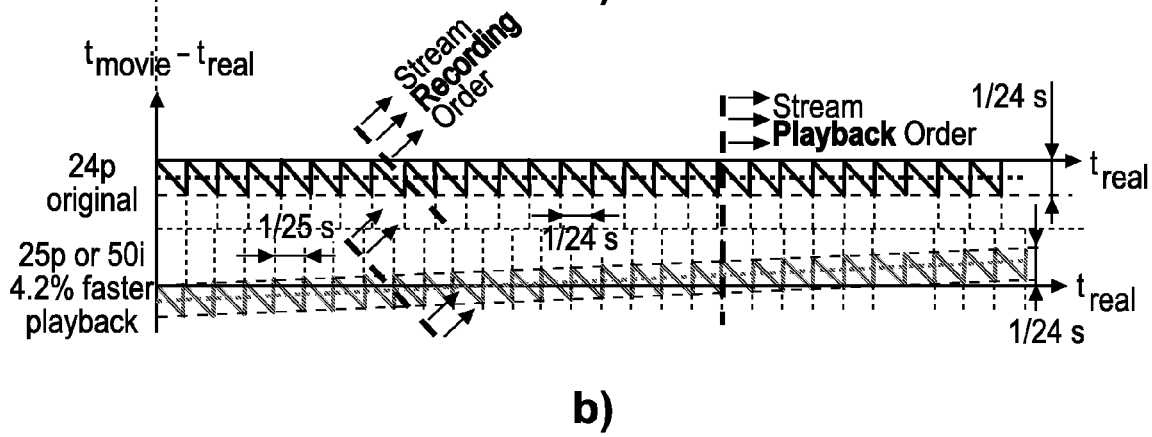
Figure 12:
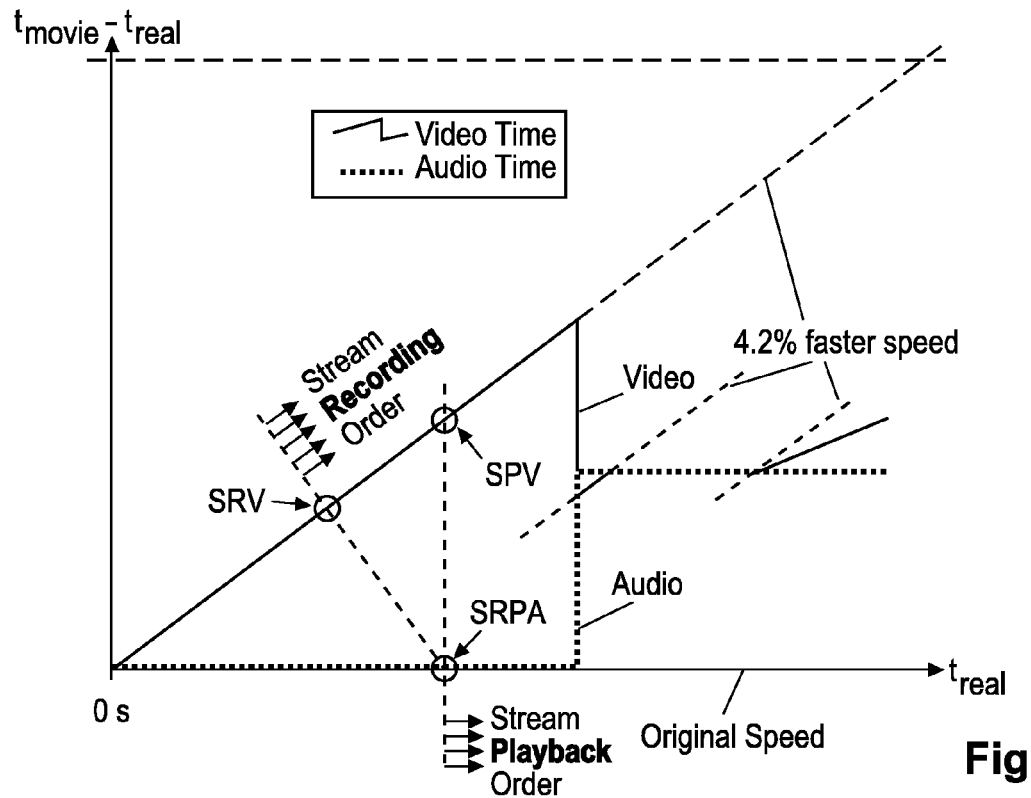

This additional synchronisation step at the beginning of the AV stream decoding is also depicted in FIGS. 11 and 12. FIG. 11 shows the difference between the stream recording order (during authoring) and the playback order. The recording order is in $t_{movie}$ direction whereas the playback order is in $t_{real}$ order. Therefore each VOBU of a DVD Video disc contains the complete video and audio stream data between two recording time lines, covering around 0.5 seconds.

In FIG. 11b the transformation to the $t_{movie}$-$t_{real}$ diagram is shown. The AV stream playback order is still in the $t_{real}$ direction, but the AV stream recording time line direction is rotated by 45 degrees to the right (i.e. clockwise). As long as the audio and video streams are close together in FIG. 11a there is no problem, i.e. there is always a cross point of audio and video and of recording time line and playback time line. But if the distance between audio and video function increases there is no common cross point for audio and video between the recording time line and the playback time line as is depicted in FIG. 12.

The example in FIG. 12 shows, in more detail than at the left side of FIG. 9d, the temporal relations when playing back a 24p AV stream as a 50i AV stream and thereby applying a-d and v-r flags. For the 24p presentation of the AV stream the recording and playback orders are close together (not shown in the figure) and a playback is performed easily. However, if the 24p AV stream is played back for a 50i TV set by applying the a-d and v-r flags, the audio and video presentations will leave their very close timing, as shown in the figure. In this example the playback time line crosses the recording time line in one point SRPA for the audio stream. But the video stream is crossed in different points: SRV (recording time line) and SPV (playback time line). Therefore a special handling is required if the device shall start the presentation at the playback time line (e.g. after a direct jump into a chapter), because the device will find the AV stream according to the recording time line, i.e. the device at first needs to synchronise the audio and video streams to get the desired time distances on the $t_{movie}$-axis as intended by the a-d and v-r flags to perform the appropriate 50i conform presentation. Following this initial synchronisation the 50i playback (by applying a-d and v-r flags) can be continuously performed as shown in FIG. 10 in its bottom part.

In other words, FIGS. 11 and 12 explain the initial process for preparing a synchronised presentation, which is followed by the continuous (and lasting) presentation.

In FIG. 12 the demux jumps somewhere into the AV stream, e.g. to a specific VOBU of a DVD Video title set. In this example, the entry point of the recorded AV stream contains the AV stream data that start according to the recording time line, i.e. it would be preferable that the AV stream starts at the playback time line (i.e. points SPV and SRPA). But unfortunately the AV stream starts with AV data according to the stream recording line (i.e. points SRV and SRPA). Therefore the device must drop the first video fields between SRV and SPV. Following dropping these video fields the appropriate 50i presentation starts at SPV and SRPA. As mentioned above, it is also possible that an entry point leads to an initial drop of the first audio frames to get the desired distance between video and audio stream on the $t_{movie}$-axis.

'Recording order' means that the order bases on the presentation time of the recorded audio frames and video fields/frames. If the internal structure of a stream type organises the data different to the presentation order, then the definitions and figures of this invention disclosure are related to the presentation time of the content. For example, the stream data byte order (decoding order) of MPEG-2 Video streams with B-frames ($I_0$, $P_1$, $B_2$, $B_3$, $P_4$, $B_5$, $B_6$, . . . ) differs from the presentation order ($I_0$, $B_2$, $B_3$, $P_1$, $B_5$, $B_6$, $P_4$, . . . ). Therefore the video stream timing in the figures corresponds to the presentation time, i.e. the timing in FIG. 12 bases on the decoded AV stream data, not on the encoded AV stream data.

Figure 21:
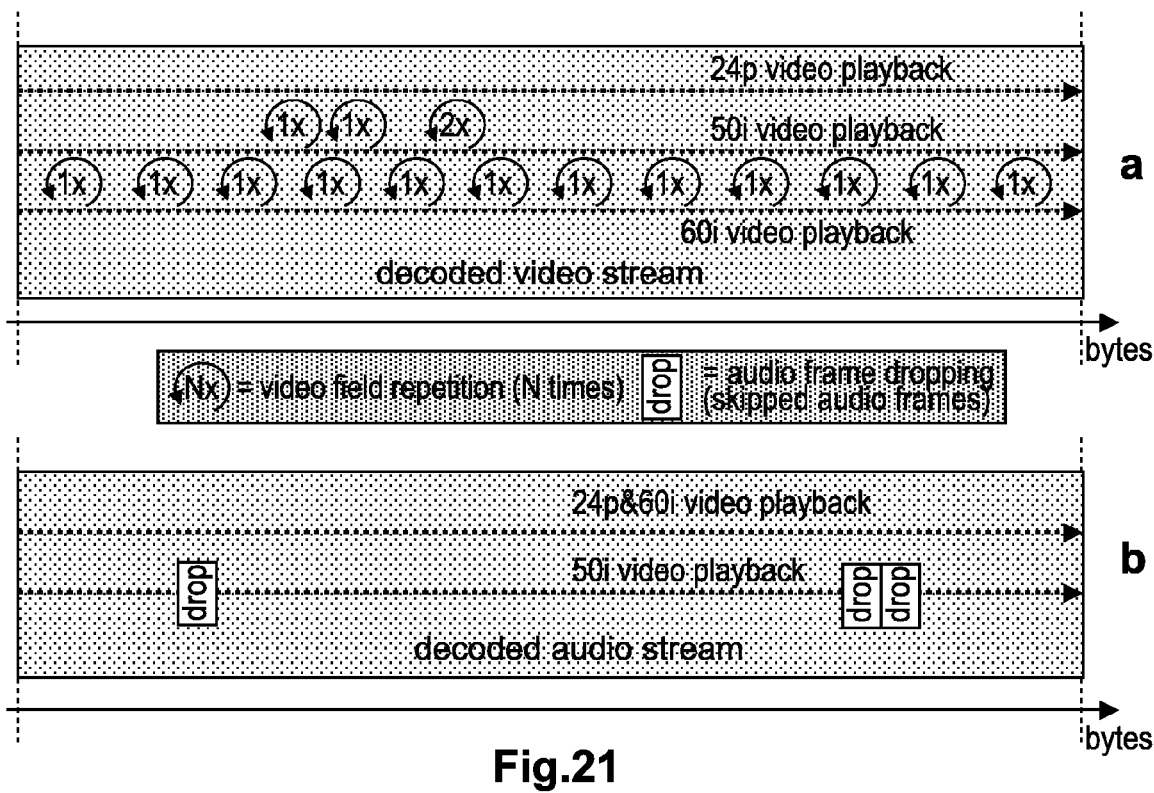

In FIG. 21 the presentation of video and audio in comparison to the decoded data of the disc (e.g. PCM audio values in an audio buffer and video fields/frames in frame buffers) is shown. This figure serves for understanding the playback control required due to the diverse repetition and dropping actions that depend on the three types 24p, 50i, and 60i of video/audio presentation. FIG. 21a is related to the decoded video whereas FIG. 21b is related to the decoded audio stream. The shaded or grey parts indicate an example of the decoded net video or net audio stream part of a multiplexed AV stream piece, e.g. AV data which represent about one second of presentation (e.g. two DVD Video VOBUs). The arrows inside the shaded or grey parts describe, which parts of the decoded stream are played back, which parts are repeated and which parts are dropped. These arrows depend on the playback mode, i.e. 24p, 50i or 60i presentation.

For the 60i video playback arrow, the 3:2 pull-down is well visible by the homogenously shared video field repetition (the real AV stream may be encoded in a different order, e.g. I, P, B, B order for MPEG-2, instead of the playback order I, B, B, P, and therefore the grey video stream part does not describe the real encoded video data of the disc, but the decoded frames/fields). Special video field repetitions and special audio frame droppings depending on the current video and audio content realise the 50i playback. 24p playback means playback of audio and video as it is, i.e. neither video field/frame repetition nor audio frame drop.

As an alternative, other than the above described processing can be used to get audio and video synchronised at the beginning of an intended 50i presentation. Additional information can be available e.g. inside the AV stream, which indicates an earlier entry point for the leading stream type (audio or video). The other stream type is muted: silence audio or black screen. This may be well acceptable for several kinds of scenes, e.g. scenes starting with a scene cut. Thereby the pause at the very start time of playback after a jump can be reduced, e.g. following a jump to a chapter or a different viewing angle, following a change to play mode after a fast forward mode. This leads to a smoother and more consumer convenient playback behaviour.

Even the beginning of the whole AV stream can start with a $t_{movie}$-axis time distance between audio and video stream timing for 50i presentation.

Also, a special indicator can be used to indicate the repeat of a black video field or frame, even there is no original black video field or frame. The demux or the video decoder inserts an artificial black screen in-between the video presentation. That makes sense especially for scene cuts. If the original 24p video stream does not contain a black screen at field position X, then the demux or video decoder, respectively, inserts an artificial black screen during 50i playback if an appropriate flag requires this for 50i output. A black screen can be generated in a simple way so that this embodiment requires only a minimum implementation effort (software change but no hardware change) and no additional, or even less, player performance.

For very critical scenes (e.g. long lasting vaS scenes) two kind of audio streams can be made available, i.e. the player switches to the appropriate audio stream depending on the output to be produced: 24p, 50i or 60i. Because such scenes will occur very seldom, the additional amount of required memory on disc is acceptable. This feature provides a very pleasant playback to the consumer.

As mentioned above, the 3:2 pull-down flags inside the AV stream can be used to provide the video field/frame repetition. In this case additional information is necessary to control the video decoder in a way that the decoder gets informed, which 3:2 pull-down flags are to be applied and which shall be ignored during playback. Such kind of information items may be stored e.g. in navigation packs of a DVD stream or appropriate locations inside other AV streams.

Because not all MPEG video decoders are able to ignore 3:2 pull-down flags during 50i playback, the 3:2 pull-down flags can be stored outside the actual MPEG stream but still in the AV stream, e.g. in navigation packs or in the pack headers as used in the DVD Video specification. These information items may be stored in a way that the decoder knows automatically which video fields/frames need to be repeated and which ones not. The demux provides this information to the MPEG decoder, e.g. by setting some hardware registers. The pure MPEG video stream does not contain any 3:2 pull-down or v-r flags. Such a solution may reduce the hardware requirements for the video decoder, but requires more action by the demux during playback.

According to a further embodiment, the 50i (60i) presentation is the native recording of the AV stream, i.e. flags are used to adapt the AV stream to 60i (50i) presentation or even to 24p presentation. For this purpose some video fields may be dropped (v-d flags), some repeated (v-r flags) and audio frames may be dropped (a-d flags) or repeated (a-r flags). These flags are used in a way analog to that of the above described v-r and a-d flags. Preferably, motion compensation is applied to avoid annoying comb effects (24p) or jerks (60i/50i) during playback.

According to a further embodiment, the 60i coded AV stream may contain interlaced video fields/frames. In this case a 24p playback is useful only if a motion compensation is available that compensates the resulting comb artifacts on a progressive display.

However, a 50i playback is feasible by:
a1) playing back the 60i video sequence as it is, i.e. 20% faster, but appropriately repeating audio frames (indicated by a-r flags),
a2) or playing back the audio sequence as it is but dropping sometimes two contiguous, or a multiple of two contiguous, video fields (indicated by v-d flags).
b) sometimes repeating some audio frames (indicated by a-r flags) and sometimes dropping two contiguous, or a multiple of two contiguous, video fields (indicated by v-d flags).

Additionally, the previous scenes may be coded by appropriate a-r and v-d flags, i.e. for this purpose some a-r and v-d flags move to previous and/or following progressive scenes. Even the reduction of the number of a-d and v-r flags in the previous and/or following progressive scenes will lead to such an effect.

According to a further embodiment, the 24p/60i coded AV stream may contain sub-titles, e.g. sub-picture for DVD. Because sub-titles are generally used for spoken words, as a default they should be synchronised with the audio presentation. But sometimes sub-titles are related to the video content, e.g. in case a sub-title describes the name of the displayed castle. Therefore there should be a mechanism to indicate the corresponding synchronisation of the sub-title. One way is to indicate whether a sub-title shall be synchronised to video, or to audio, or even to the average timing of video and audio. That solution is rather restricted but will be sufficient in more than 95% of all cases.

Another way is to indicate a special start time and end time to the already recorded sub-title information, e.g. a time offset for start time and duration of a DVD Sub-picture Unit in the NV_PCK of the according VOBU.

A third way is to use additional sub-title streams for the 50i playback, i.e. for 50i playback such additional sub-title streams are used instead of the conventional 24p/60i sub-title streams. For example, for DVD this can be realised by using a separate PGC for 50i that selects the correct sub-picture units.

For special applications the audio stream can be speeded up (e.g. by pitch conversion) by about 2.1% during authoring. For 24p/60i playback some audio frames are repeated and for 50i playback some audio frames are dropped. That would reduce the required synchronisation process for 50i playback. But this embodiment would speed up the original playback mode (24p), i.e. additional synchronisation is required for 24p/60i playback. In the average, the synchronisation gets minimised. A drawback is that achieving an original 24p playback speed would be very difficult.

Because the structure of the VC-1 coding is very similar to that of MPEG Video coding, the above-made statements with respect to MPEG Video are valid for VC-1 as well although the related flags in VC-1 are called differently.

How to determine the best fitting audio frames for dropping is also shown in EP 04006792.8. How to determine the best fitting video fields/frames for repeating with merely visible jerks or even without any perceptible jerk is shown in PCT/EP2004/012483. EP 04006792.8 shows an easy-to-implement way of 50i output from 24p content using 24:1 pull-down. The present invention combines in a tricky way the advantages of the above three applications but avoids their main disadvantages.

This invention is applicable to current DVD players as an additional feature but requires additional information about the appropriate a-d and v-r flags. Such information can be downloaded from the Internet or can be attached as separate data on the DVD disc, separated from the known DVD Video conform data. This invention is also applicable to future disc formats like HD-DVD and Blu-ray. The inventive disc is fully backward compatible to old 50i TV sets, and is forward compatible to 24p compatible TV sets. A change from old TV sets to HDTV sets is simplified significantly. Consumers in 50i (or 60i) countries owning a 24p compatible HDTV set can view movies with original playback speed.

C) Special Constraints for Some Known Video Codecs

Figures 16, 17:
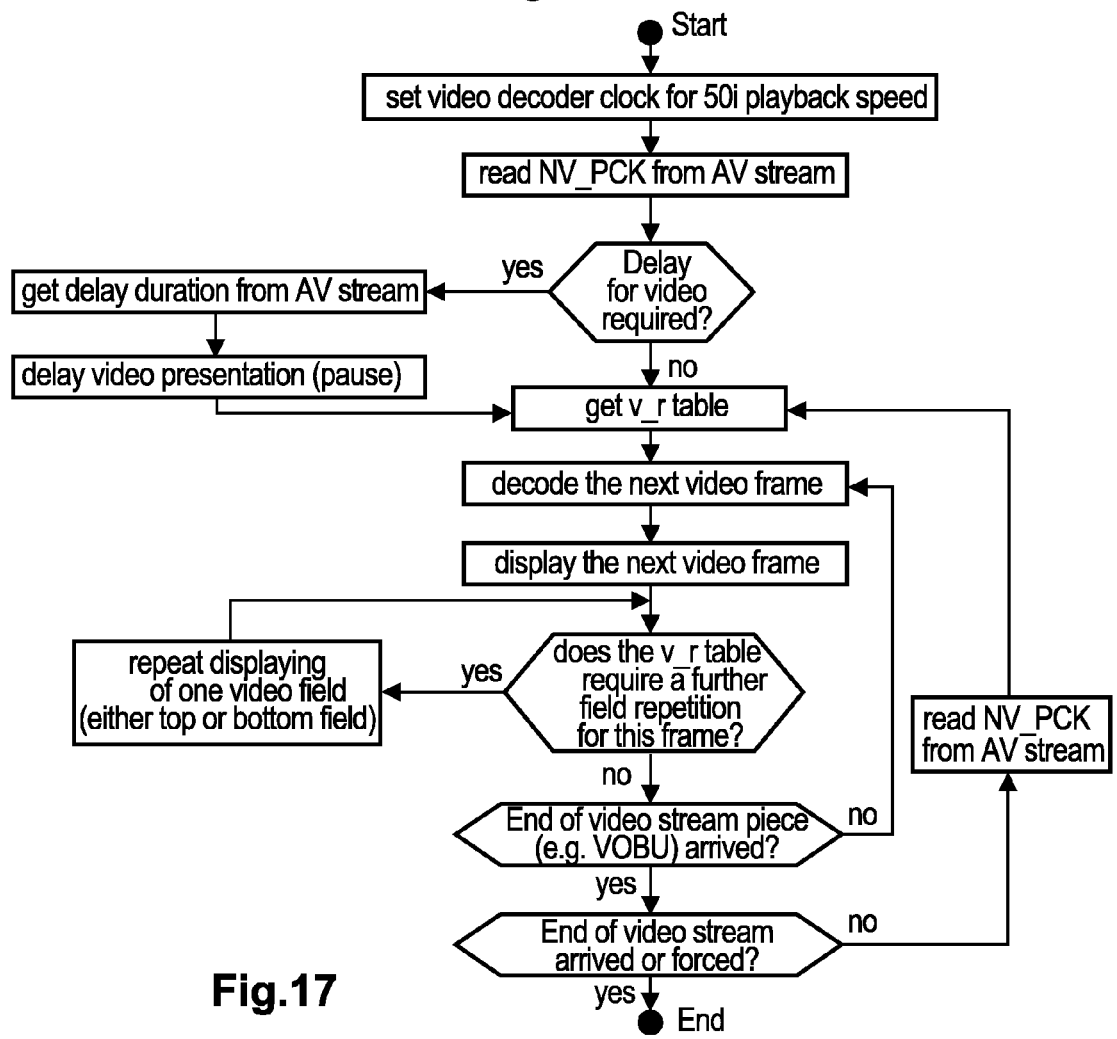
Figure 19:
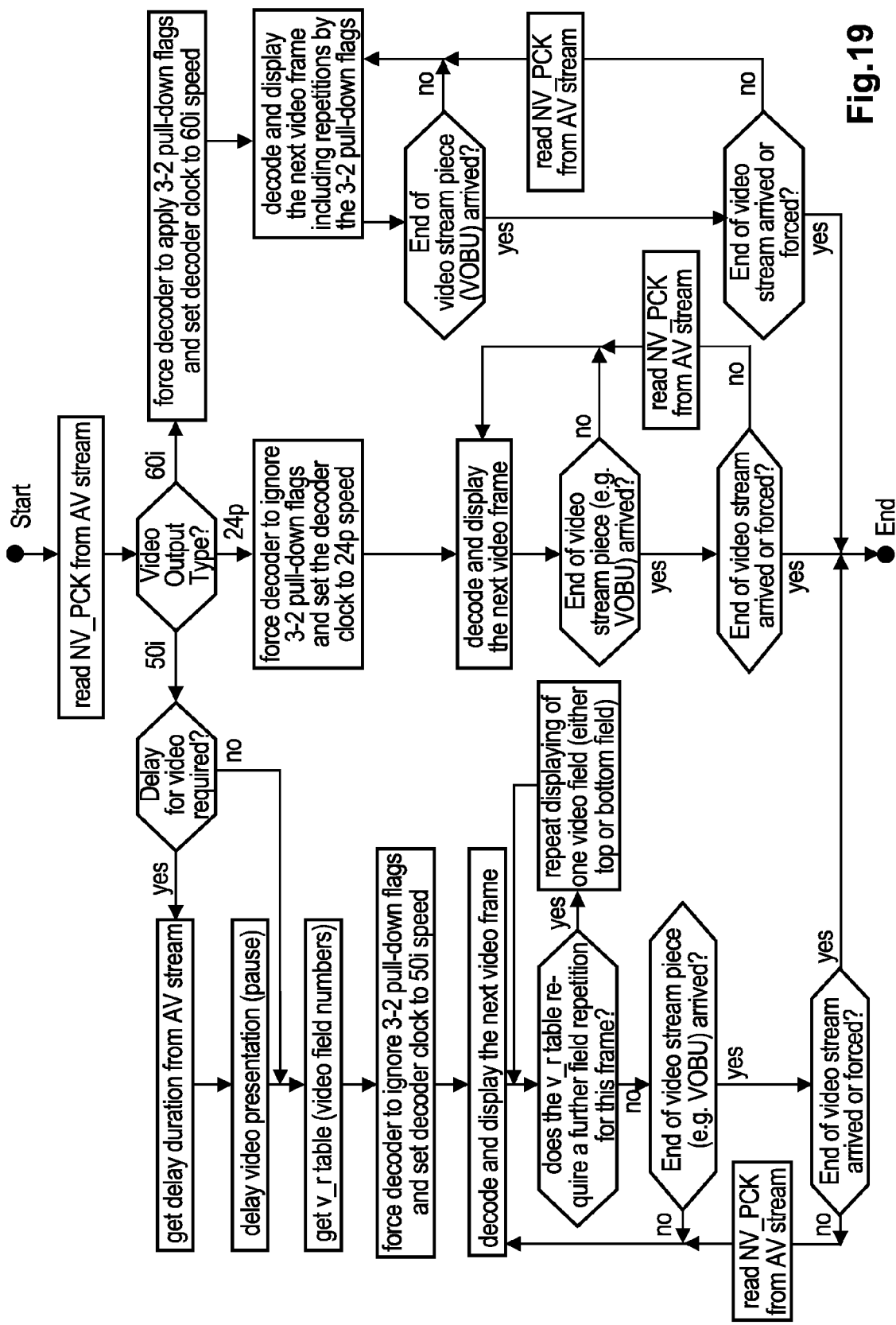

As mentioned above, a controller outside the known decoder can control the playback such that the video fields and video/audio frames are repeated or dropped as required, i.e. the decoder is working in a slave mode. The presentation process of such a device especially for 50i playback is shown by FIGS. 13 and 17. FIG. 19 shows an appropriate video presentation process for 50i, 60i and 24p.

FIG. 17 shows a flow diagram for 50i presentation of a 24p AV stream, in particular the control of the stream data following the decoding of a frame or field, which is an example for 50i video output by manipulating the video output of the video decoder. This solution corresponds to the processing shown in the video part of FIG. 13. A drawback of this solution is that the video decoder needs additional control for the output. However, advantageously such additional control is feasible with most ones of the (or all) currently available MPEG-2 video decoders, because such control is necessary for trickplay.

FIG. 19 shows a flow diagram representing the 24p, 50i, and 60i video presentation of a 24p video stream, which is related to the video part of FIG. 13, and which in relation to 50i corresponds to FIG. 17. The stream contains 3:2 pull-down flags. For the native or original 24p presentation the 3:2 pull-down flags are ignored. For 60i output the 3:2 pull-down flags are used as they are coded in the video stream. For 50i output the 3:2 pull-down flags are ignored and instead additional information items (e.g. in the NV_PCK) about the fields of that video stream piece (e.g. VOBU) are used. This information items indicate special video fields/frames and the number of repetitions for these fields. Additionally, a start offset between audio and video decoding stream for 50i output is available. The audio decoding itself is not part of this diagram.

Alternatively, the stream may be manipulated during playback according to the intended output 50i, 60i or 24p. Such video presentation processes are shown in FIG. 18 in connection with the above-described FIG. 14.

Figure 18:
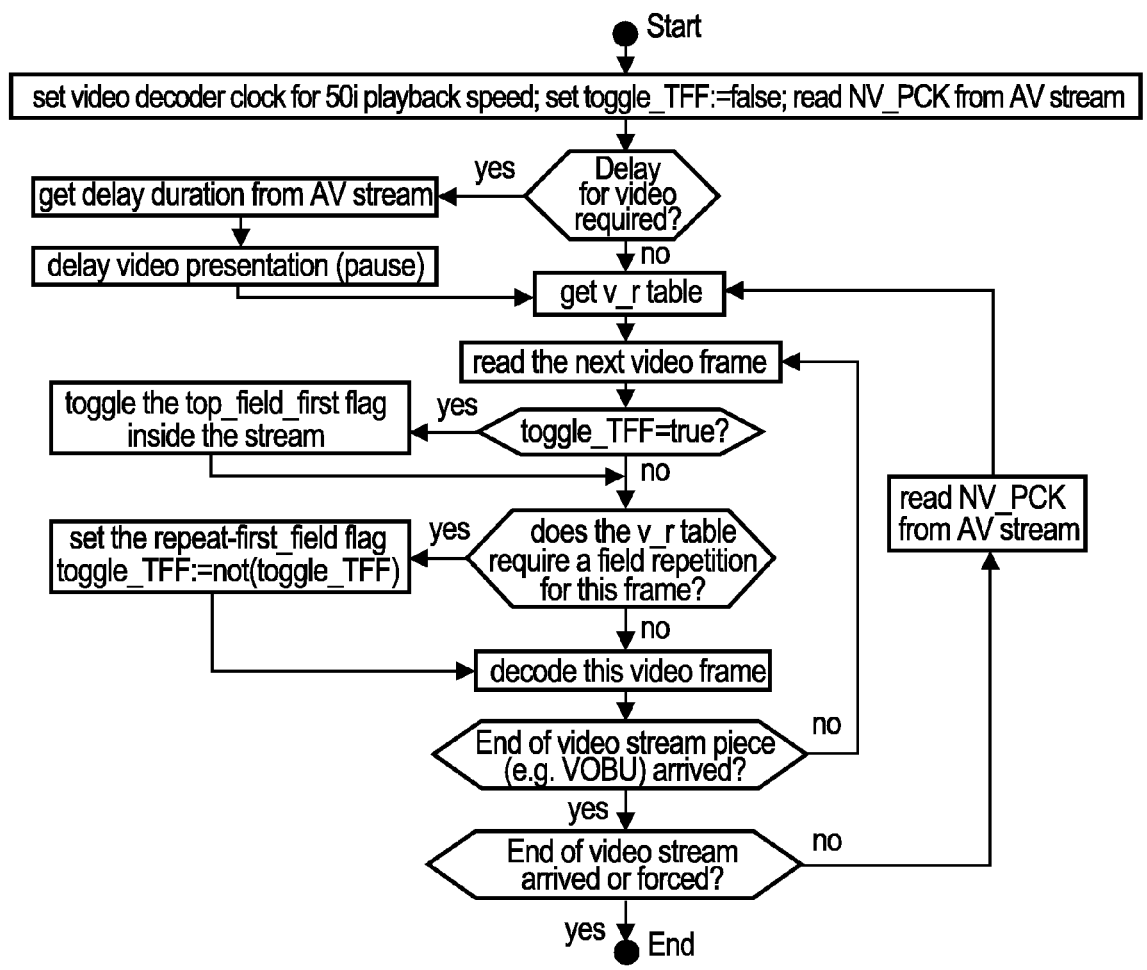

In the 50i presentation of a 24p AV stream FIG. 18 shows the control of the stream data before it is sent to the actual video decoder for decoding, i.e. the 24p video stream is manipulated before being decoded. This solution corresponds to the idea shown in the video part of FIG. 14. Neither the audio decoding nor the 24p and 60i output are shown in this diagram. One drawback of this solution is that even the manipulated video stream can not be used to repeat a single video field or video frame several times, because this feature is neither supported by MPEG nor by VC-1. Therefore, additional control over the video decoding process can be required.

The following describes in three sub-sections the additional requirements/constraints for the video stream to perform this real-time manipulation. Additional information items combined with the actual video stream data (i.e. still in the AV stream) are necessary to provide the playback feature for this kind of stream as 60i as well as 50i, for which purpose special constraints are necessary for the decoders, depending of the type of the decoder itself. Essential constraints for MPEG-2, MPEG-4 AVC, and SMPTE VC-1 codecs are described. The additional information items may be arranged in special information blocks like the navigation packs in DVD Video streams (VOB files).

C.1) MPEG-2

Advantageously, the 24p, 50i and 60i streams have the same bit structure, i.e. the amount of bits required for coding these three different presentation modes does not need to differ, which is different in VC-1. However, some flags need different values for the different presentation modes. Due to these requirements the following properties are required for all MPEG-2 video streams with 24p content:

The flag progressive_sequence of the sequence_extension( ) is set to '0', as it is already specified for current DVD Video.

progressive_frame of the picture_coding_extension( ) is set to '1' for 24p content. Only for real interlaced source material progressive_frame is set to '0'.

picture_structure is set to '11' (in binary format) to indicate a frame-picture. Only for real interlaced source material picture_structure is set to '10' or '01', respectively.

repeat_first_field of the picture_coding_extension( ) i set to '0' because 24p content does not need pull-down.

all top_field_first values of all picture_coding_extension( ) blocks in the same video stream are identical, i.e. are either '0' or '1'.

During decoding the demux replaces the appropriate flags in the stream to force the intended playback, e.g. 3:2 pull-down, or a variable pull-down by the v-r flags. Another alternative is a more flexible decoder that is controlled by appropriate additional registers, i.e. which allows top_field_first and repeat_first_field setting via registers.

Furthermore, the timestamps must be appropriately handled because of the different playback speeds 24p, 50i and 60i. The recorded timestamps are appropriate for one of the playback speeds only. Since a re-stamping of all timestamps in the stream is extensive work, a better solution is to change the video decoder clock. The most appropriate processing depends on the selected hardware.

It may be useful to change the parameter frame_rate, too.

During decoding for 24p, 50i or 60i presentation the appropriate re-settings for top_field_first and repeat_first_field are performed before sending these stream data to the video decoder:

for 50i presentation the v-r flags are translated into the corresponding top_field_first and repeat_first_field settings;

for 60i presentation the appropriate 3:2 pull-down is translated into the corresponding top_field_first and repeat_first_field settings;

for 24p playback the video stream is sent to the decoder in its original format (e.g. always repeat_first_field=0).

FIG. 15 shows some combinations of flag settings and the resulting video output, i.e. how many times fields (T or B) or frames (Fr) are repeated, and the output order of top fields (T) and bottom fields (B). 'T' indicates the presentation of a top field, 'B' the presentation of a bottom field, 'Fr' the presentation of a whole frame. 'T-B' indicates the order of a top-and-bottom-field presentation, i.e. top field first for 'T-B'. If a 'T', a 'B' or an 'Fr' occurs more than once in a cell of this table this means a repetition of the identical field or frame, respectively. MPEG-2 Video applies 3:2 pull-down by setting special flags in the video stream. If the video source is based on frames (as is true for 24p movies) the settings 5 to 8 are used appropriately, see the lines with shaded or grey background. These settings can be used for the v-r flags as well. Unfortunately it is not possible to provide these flags in the same video stream for a 60i output (with 3:2 pull-down) as well as for a 50i output. So, these flags may be used for 3:2 pull-down, for v-r flags, for a mixture of both, or nothing at all, i.e. without any flags.

If the progressive_frame flag indicates an interlaced source, e.g. a TV recording, such a video stream can not be presented in different speeds according to this invention. Such content needs to be encoded separately for each presentation format. That is acceptable because the main content of video discs sold are movies with 24p source distributed in all parts of the world, whereas (interlaced) TV content is normally broadcast or distributed for a very restricted area only, i.e. in most cases for a single country.

C.2) MPEG-4 AVC

Advantageously, the 24p, 50i and 60i streams have the same bit structure, i.e. the amount of bits required for coding these three different presentation modes does not need to differ, which is different in VC-1. Unfortunately, each MPEG Slice may differ in the way it is encoded. Therefore bitstream changes for each slice may be required. The following properties are required for all MPEG-4 AVC video streams for 24p content:
the flag vui_parameters_present_flag in seq_parameter_set_rbsp( ) is set to '1';
the flag pic_struct_present_flag in VUI_parameters( ) is set to '1';
the flag field_pic_flag in slice_header( ) is set to '0';
During decoding the demux replaces the appropriate flags (pic_struct in pic_timing(payloadSize)) in the stream to force the intended playback, e.g. 3:2 pull-down, or a variable pull-down by the v-r flags. Another alternative is a more flexible decoder that is controlled by appropriate additional registers, i.e. which allows top_field_first and repeat_first_field setting via registers.

Furthermore, the timestamps must be appropriately handled because of the different playback speeds 24p, 50i and 60i. The recorded timestamps are appropriate for one of the playback speeds only. Since a re-stamping of all timestamps in the stream is extensive work, a better solution is to change the video decoder clock. The most appropriate processing depends on the selected hardware.

During decoding for 24p, 50i or 60i presentation the appropriate re-settings for pic_struct are performed before sending these stream data to the video decoder:
for 50i presentation the v-r flags are translated into the corresponding pic_struct settings;
for 60i presentation the appropriate 3:2 pull-down is translated into the corresponding pic_struct settings;
for 24p playback the video stream is sent to the decoder in its original format.

Again, FIG. 15 shows some combinations of flag settings and the resulting video output, i.e. how many times fields (T or B) or frames (Fr) are repeated, and the output order of top fields (T) and bottom fields (B).

If the progressive_frame flag indicates an interlaced source (e.g. a TV record), then such a video stream can't be presented in different speeds by this invention. I.e. such content needs to be coded either for the 50i, the 60i, or even the 24p presentation separately.

C.3) SMPTE VC-1

Depending on the values of some flags inside the stream, some other (following) flags appear or don't appear, e.g. FCM flags will appears only if INTERLACE is set to '1'. In order to get the full control for all playback modi the stream is coded such that as much as possible related flags appear in the recorded stream. Due to these requirements the following properties are defined for all VC-1 streams:
Only the Advanced Profile shall be used.
the 24p video stream contains the Sequence layer bitstream for Advanced Profile;
the PULLDOWN flag is set to '1', which is necessary to force appearance of the flags TFF and RFF;
the INTERLACE flag shall be set to '1', which is necessary to force the appearance of the flags FCM, TFF, and RFF;
The decoder must be controllable in a way that it handles the video stream as INTERLACE=0 by ignoring the additional flags like FCM. That is necessary because, normally, the decoder would not expect the FCM flag. Therefore, without such a special mode the decoder would be confused. Nevertheless, the stream indicates always INTERLACE=1. This can be realised by appropriate decoder register settings;
During decoding the demux replaces the appropriate flags in the stream to force the intended playback, e.g. 3:2 pull-down or a variable pull-down by the v-r flags. Another alternative would be a more flexible decoder, which is controllable by appropriate additional registers, i.e. which allows TFF, RFF, RPTFRM setting via registers.

Furthermore, the timestamps must be appropriately handled because of the different playback speeds 24p, 50i and 60i. The recorded timestamps are appropriate for one of the playback speeds only. Since a re-stamping of all timestamps in the stream is extensive work, a better solution is to change the video decoder clock. The most appropriate processing depends on the selected hardware.

During Decoding:
For a 24p playback the decoder is switched to the 'INTERLACE=0' mode, i.e. the decoder expects the appearance of flags which are intended to appear only in the case of 'INTERLACE=1', but for the 24p playback the decoder skips such flags, e.g. the FCM flag in the picture layer.

FIG. 16 shows some combinations of flag settings and the resulting video output, i.e. how many times fields (T or B) or frames (Fr) are repeated, and the output order of top fields (T) and bottom fields (B). 'T' indicates the presentation of a top field, 'B' the presentation of a bottom field, 'Fr' the presentation of a whole frame. 'T-B' indicates the order of a top-and-bottom-field presentation, i.e. top field first for 'T-B'. If a 'T', a 'B' or an 'Fr' occurs more than once in a cell of this table this means a repetition of the identical field or frame, respectively.

SMPTE VC-1 Video applies 3:2 pull-down by setting special flags in the video stream. If the video source is based on frames (as is true for 24p movies) the settings 8 to 11 are used appropriately, see the lines with shaded or grey background. These settings can be used for the v-r flags as well. Unfortunately it is not possible to provide these flags in the same video stream for a 60i output (with 3:2 pull-down) as well as for a 50i output. So, these flags may be used for 3:2 pull-down, for v-r flags, for a mixture of both, or nothing at all, i.e. without any flags.

Figure 20:
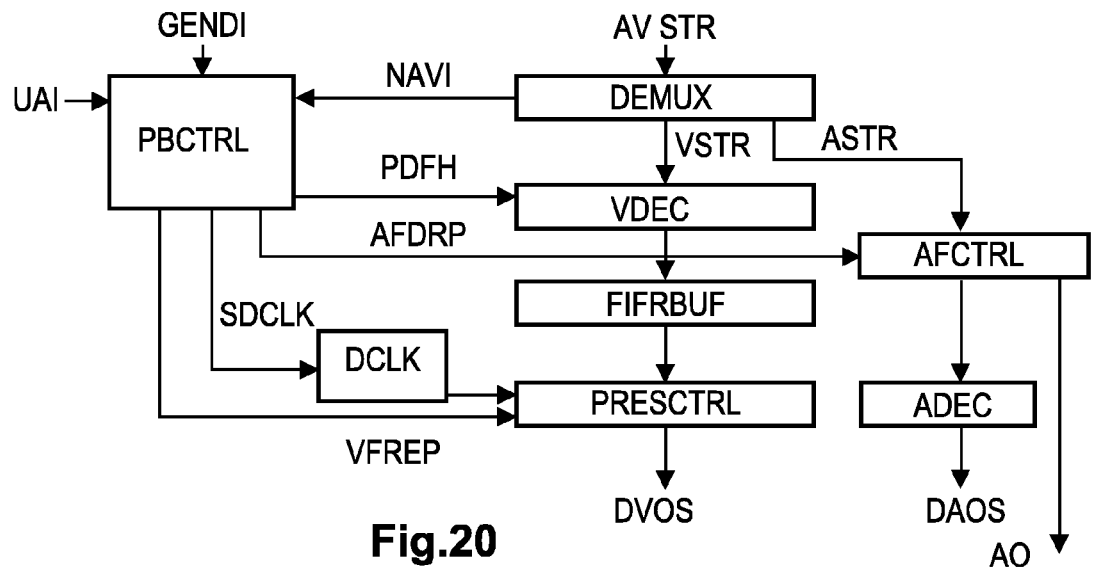

FIG. 20 shows a disc player or a playback engine including a demultiplexer DEMUX receiving an AV data stream AVSTR and providing a video stream VSTR to a video decoder VDEC for decoding frames or fields, and an audio stream ASTR via an audio frame control AFCTRL to an audio decoder ADEC that provides decoded audio output signal or signals DAOS. The audio frame control AFCTRL can provide a digital audio output AO for an external audio decoder. The output signal of video decoder VDEC passes through a field or frame buffer FIFRBUF to a presentation control PRESCTRL that provides a decoded video output signal DVOS. FIFRBUF can be included into VDEC. A sub-picture decoder is not shown (for simplification reasons). The operation of this disc player can follow the flow diagram operation of FIG. 19.

The playback control PBCTRL gets necessary user access information UAI from the user via a user interface that is not shown, and receives general information items GENDI about the disc (general content information, e.g. VIDEO_TS.IFO of a DVD Video disc), and navigation information items NAVI (e.g. NV_PCK of a DVD Video disc) from the AV stream itself via demultiplexer DEMUX. An information source about the properties of the display to the player is not shown. The required display information items can be input to PBCTRL by the user via UAI, or via an automatic display recognition. By a set decoder clock signal SDCLK the playback control PBCTRL controls clock of a decoder clock DCLK for 24p, 50i or 60i outputs, whereby the time stamps inside the video stream are handled appropriately in presentation control PRESCTRL.

The playback control PBCTRL also controls the frame or field repetition in presentation control PRESCTRL by a force video repetition command VFREP for 50i presentation, and controls the frame dropping in audio frame control AFCTRL by a force audio frame dropping command AFREP, and controls the 3:2 pull-down handling in video decoder VDEC by a 3:2 pull-down flag handling command PDFH for 60i presentation.

The invention claimed is:

1. Method for replaying together a video signal and one or more audio signals related to audio/video data that are based on 24Hz video frame frequency for said video signal and an audio signal speed corresponding to said 24Hz frame frequency, said method comprising the steps:
   if said video signal is to be presented corresponding to said 24Hz frame frequency, processing said video and audio data corresponding to said 24Hz frame frequency for the common presentation;
   if said video signal is to be presented corresponding to a 60Hz or nearly 60Hz field frequency, processing said audio data with a speed corresponding to 24Hz or nearly 24Hz frame frequency for the common presentation, and processing said video data corresponding to a 60Hz or nearly 60Hz field frequency using a 3:2 pull-down for the common presentation;
   if said video signal is to be presented corresponding to a 50Hz or nearly 50Hz field frequency, when processing said audio data and said video data for the presentation, adaptively dropping audio signal frames and/or adaptively repeating video fields or frames, said dropping and/or repeating depending on the current content of said video and audio signals such that the signal where a dropping or a repeating, respectively, is more perceptible controls the synchronization between said video and audio signals for the common presentation,
   wherein, for specific scene parts, instead of the corresponding sequence of pictures to be used for said 24Hz frame frequency or said 60Hz or nearly 60Hz field frequency presentation, a corresponding additional sequence of pictures specifically available for said 50Hz or nearly 50Hz field frequency presentation of said audio/video data is used for said presentation but the corresponding sequence of pictures for said 24Hz frame frequency or said 60Hz or nearly 60Hz field frequency presentation is not used.

2. Method according to claim 1, wherein in case of presentation corresponding to said 50Hz or nearly 50Hz field frequency the current field frequency is variable and the average field frequency is in the range of 48Hz to 50Hz.

3. Method according to claim 1, wherein said video field or frame repetition is carried out for fields or frames which include small motion speeds only in the picture content, or which are located at the end of a scene or at the beginning of a new scene or in dark scenes, and wherein said audio frame dropping is carried out for frames which include less harmonic audio, low volume, no lip-synchronic parts, and/or noise-like audio periods.

4. Method according to claim 1, wherein at scene cuts instead of said video field or frame repetition an insertion of one or more black or grey fields or frames is carried out.

5. Method according to claim 1, wherein said video field or frame repetition is controlled by evaluating video repetition flags which are contained in said audio/video data, and/or wherein said audio frame dropping is controlled by evaluating audio dropping flags which are contained in said audio/visual data.

6. Method according to claim 5, wherein said audio/video data are stored on a storage medium and said video repetition flags form a table of sector numbers or relative sector numbers, byte addresses and byte values of said storage medium whereby each set of such three values represents one video repetition flag and the byte address indicates an exact byte inside that sector, and whereby said 50Hz or nearly 50Hz field frequency presentation this byte is replaced by the byte value of the corresponding video repetition flag.

7. Method according to claim 1, wherein different ones of said audio frames are dropped in different ones of said audio signals.

8. Method according to claim 1, wherein for specific audio frames, instead of the corresponding audio frames to be used for said 24Hz frame frequency or said 60Hz or nearly 60Hz field frequency presentation, corresponding specific audio frames for said 50Hz or nearly 50Hz field frequency presentation of said audio/video data are used for said presentation.

9. Method according to claim 1, wherein said specific parts for said 50Hz or nearly 50Hz field frequency presentation and/or said specific audio frames are loaded via Internet from a corresponding provider.

10. Method according to claim 1 wherein, if necessary for a fast video/audio synchronization, a start offset between audio and video presentation is applied at the beginning of a presentation, for example upon a playback start after a direct jump to a specific scene.

11. Method according to claim 10, wherein said audio/video data includes additional synchronization information to be applied as said start offset.

12. Method according to claim 1, wherein at the beginning of the 50Hz or nearly 50Hz field frequency presentation for the whole audio/video data stream a basic start offset is applied between audio and video.

13. Method for generating or coding audio/video data that represent a video signal and one or more audio signals, said video signal having 24Hz video frame frequency and the audio signal speed corresponding to said 24Hz frame frequency, said method comprising the steps:
   including in said audio/video data video repetition flags which can be used in a presentation unit for said video and audio signals for controlling video field or frame repetition;
   including in said audio/video data audio dropping flags which can be used in said presentation unit for controlling audio signal frame dropping, so as to carry out a synchronized presentation of said audio and video signals with a 50Hz or nearly 50Hz field frequency of said video signal; and
   including in said audio/video data for specific scene parts, in addition to a corresponding sequence of pictures for said 24Hz frame frequency, a corresponding sequence of pictures specifically available for a 50Hz or nearly 50Hz field frequency presentation of said audio/video data in said presentation unit, instead of said sequence of pictures for said 24Hz frame frequency.

14. Non-transitory storage medium which contains, or has recorded on it, audio/video data that are generated or code according to the method of claim 13.

* * * * *